(12) United States Patent
Wu et al.

(10) Patent No.: US 8,503,574 B2
(45) Date of Patent: Aug. 6, 2013

(54) METHODS FOR CARRIER FREQUENCY OFFSET DETECTION AND COMPENSATION AND TRANSMITTERS AND RECEIVERS UTILIZING THE SAME

(75) Inventors: Jing-Shown Wu, Taipei (TW); Hen-Wai Tsao, Taipei (TW); Yang-Han Lee, Taipei (TW); Yu-Lin Shiao, Taipei (TW)

(73) Assignee: National Taiwan University, Taipei (TW)

( * ) Notice: Subject to any disclaimer, the term of this patent is extended or adjusted under 35 U.S.C. 154(b) by 432 days.

(21) Appl. No.: 12/785,740

(22) Filed: May 24, 2010

(65) Prior Publication Data
US 2011/0096814 A1 Apr. 28, 2011

(30) Foreign Application Priority Data
Oct. 22, 2009 (TW) ................................ 98135738 A

(51) Int. Cl.
*H04L 27/00* (2006.01)
(52) U.S. Cl.
USPC ........... 375/316; 375/261; 375/324; 375/326; 375/339; 455/119; 329/302; 329/323; 329/358

(58) Field of Classification Search
USPC .......... 375/261, 316, 326, 339, 324; 329/302, 329/323, 358; 455/119
See application file for complete search history.

(56) References Cited

U.S. PATENT DOCUMENTS

| | | | |
|---|---|---|---|
| 2004/0005022 A1* | 1/2004 | Zhu et al. | 375/365 |
| 2007/0133391 A1* | 6/2007 | Roh et al. | 370/208 |
| 2008/0159430 A1* | 7/2008 | Steer et al. | 375/267 |
| 2010/0303167 A1* | 12/2010 | Juang et al. | 375/267 |

* cited by examiner

*Primary Examiner* — Leila Malek
(74) *Attorney, Agent, or Firm* — Wang Law Firm, Inc.; Li K. Wang; Stephen Hsu

(57) ABSTRACT

A transmitter includes an encoding module, an adaptive hierarchical signal mapping module and a transceiver module. The encoding module receives an input signal and encodes the input signal. The input signal includes data to be transmitted. The adaptive hierarchical signal mapping module modulates the encoded signal according to one or more hierarchical level distance ratios to obtain modulated symbols. The hierarchical level distance ratio defines distances between the modulated symbols. The transceiver module generates a radio frequency signal according to the modulated symbols and transmits the radio frequency signal to an air interface.

17 Claims, 24 Drawing Sheets

US 8,503,574 B2

METHODS FOR CARRIER FREQUENCY OFFSET DETECTION AND COMPENSATION AND TRANSMITTERS AND RECEIVERS UTILIZING THE SAME

This Application claims priority of Taiwan Patent Application No. 98135738, filed on Oct. 22, 2009, the entirety of which is incorporated by reference herein.

BACKGROUND OF THE INVENTION

1. Field of the Invention

The invention relates to a method and apparatus for carrier frequency offset detection in an Orthogonal Frequency Division Multiplexing (OFDM) system, and more particularly, to a method and apparatus for using a hierarchically modulated data signal to detect carrier frequency offset.

2. Description of the Related Art

Recently, Orthogonal Frequency Division Multiplexing (OFDM) has become an important wireless communication technology. Because of the high transmission rate of OFDM technology offers high transmission rates, data can be easily and efficiently transmitted and received in a wireless communication environment. Therefore, OFDM technology has been widely applied to, for example, Digital Audio Broadcasting (DAB), Digital Video Broadcasting-Terrestrial/Handheld (DVB-T/H), Wireless Fidelity (Wi-Fi) and Worldwide Interoperability for Microwave Access (WiMAX) etc., and is also regarded as a fundamental and core technology in the 4th-Generation Wireless System.

For OFDM technology, data is transmitted by a plurality of subcarriers which overlap and are orthogonal with each other. In addition, duplicated data which is copied from the end of a portion of a symbol is defined as a cyclic prefix (CP) or a guard interval (GI), and is used to protect the OFDM symbol from inter-symbol interference (ISI) generated by multi-path fading and reflection in channels. The bandwidth used by the OFDM system is divided into a number of narrow sub-bands so that the sub-bands are only affected by flat fading. Thus, only one standard equalizer is needed in the receiver to adjust signal gain and compensate for flat fading of channels. In this fashion, the OFDM system has many advantages such as having multi-path fade resistance properties, high-efficiency bandwidths, low-complexity equalizers and high transmission rates . . . etc.

However, the OFDM system is affected by Doppler effect under an environment of high speed movement, such as that which may be found with high speed rail trains. The OFDM system which is regarded as a multi-carrier system is very sensitive to carrier frequency offset (CFO) caused by the Doppler effect. Carrier frequency offset will destroy the orthogonality between subcarriers and generate inter-carrier interference (ICI) between the subcarriers such that performance and bit error rate of the OFDM system in a high speed environment decreases and increases, respectively. Therefore, an important issue to be solved in the OFDM system, is, efficient detection of carrier frequency offset (CFO) to cancel inter-carrier interference (ICI) between subcarriers.

BRIEF SUMMARY OF THE INVENTION

Transmitters, receivers, and methods for carrier frequency offset detection and compensation are provided. An exemplary embodiment of a transmitter comprises an encoding module, an adaptive hierarchical signal mapping module and a transceiver module. The encoding module receives an input signal and encodes the input signal. The input signal comprises data to be transmitted. The adaptive hierarchical signal mapping module modulates the encoded signal according to one or more hierarchical level distance ratios to obtain a plurality of modulated symbols. The hierarchical level distance ratios define distances between the modulated symbols. The transceiver module generates a radio frequency signal according to the modulated symbols and transmits the radio frequency signal to an air interface.

An exemplary embodiment of a receiver comprises a transceiver module, an adaptive hierarchical signal de-mapping module, a decoding module, an error analyzing device and a frequency offset estimation device. The transceiver module receives a radio frequency signal from an air interface and converts the radio frequency signal to a baseband signal according to a carrier frequency and a carrier frequency offset (CFO) compensation factor. The adaptive hierarchical signal de-mapping module demodulates the baseband signal according to one or more hierarchical level distance ratios to obtain a plurality of demodulated symbols. The decoding module comprises a plurality of decoding paths to hierarchically decode the demodulated symbols and detect error bits in each demodulated symbol, and generates a plurality of decoded signals in each decoding path. The error analyzing device receives error bit information of each decoding path from the decoding module and estimates a bit error rate (BER) in each decoding path. The frequency offset estimation device generates the CFO compensation factor according to the bit error rates.

An exemplary embodiment of a method for carrier frequency offset detection and compensation comprises: receiving a radio frequency signal from an air interface; converting the radio frequency signal to a baseband signal according to a carrier frequency and a carrier frequency offset (CFO) compensation factor; demodulating the baseband signal to generate a plurality of demodulated symbols; hierarchically decoding each demodulated symbol in a plurality of decoding paths, detecting error bits in each demodulated symbol in each decoding path, and generating a plurality of decoded signals in each decoding path and obtaining a bit error rate in each decoding path; and analyzing properties of the bit error rate in each decoding path to obtain the CFO compensation factor.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Transmitter Structure and Hierarchical Modulation

Figure 1:
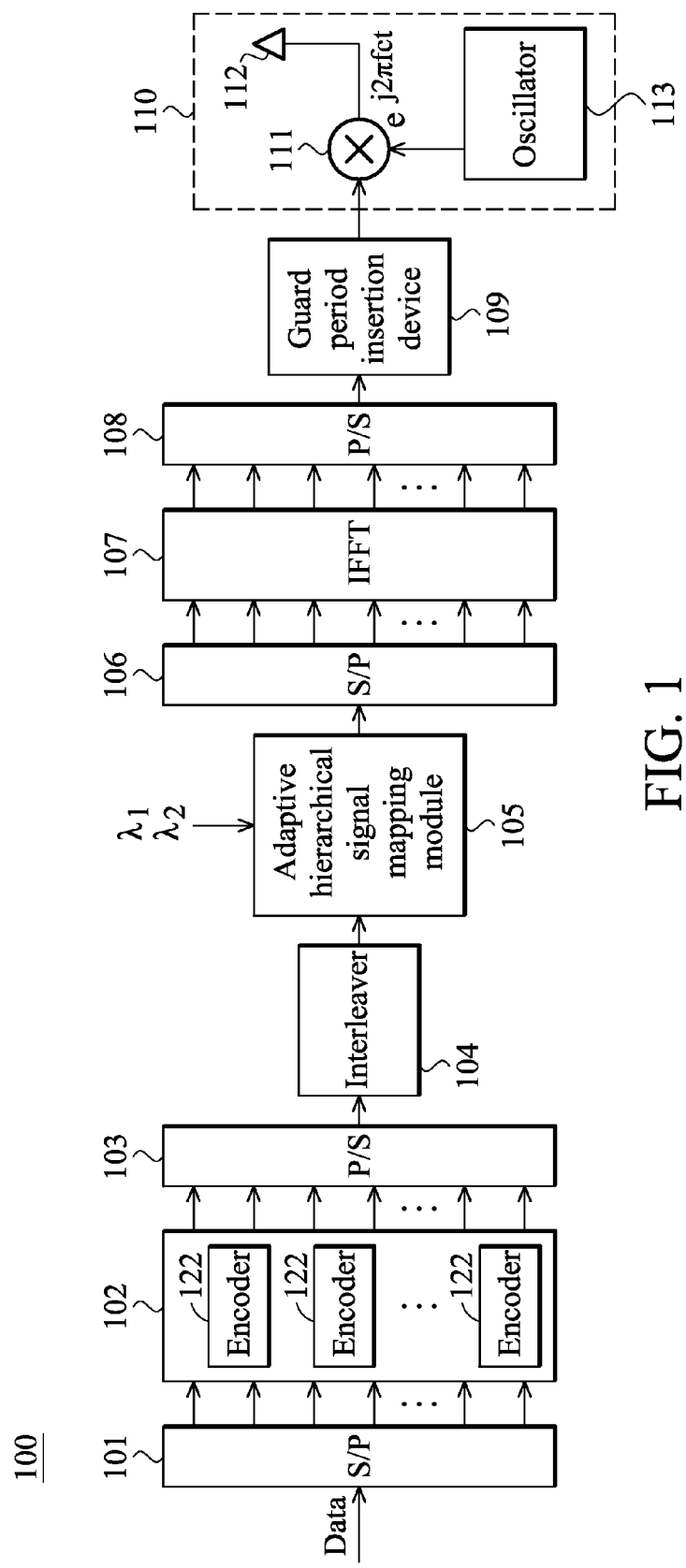
FIG. 1 shows a block diagram of a transmitter according to an embodiment of the invention.

FIG. 1 shows a block diagram of a transmitter 100 according to an embodiment of the invention. In the embodiment of the invention, the transmitter 100 may be utilized in an Orthogonal Frequency Division Multiplexing (OFDM) communication system. As shown in FIG. 1, the transmitter 100 may comprise serial to parallel (S/P) converters 101 and 106, parallel to serial (P/S) converters 103 and 108, an encoding module 102, an interleaver 104, an adaptive hierarchical signal mapping module 105, an (Inverse Fast Fourier Transform (IFFT) module 107, and a guard period insertion device 109 and a transceiver module 110.

According to an embodiment of the invention, after being converted by the serial to parallel converter 101, the data to be transmitted is encoded by the encoder module 102. Next, the encoded signal is converted by the parallel to serial converter 103 and passed to the interleaver 104. The interleaver 104 may be designed, according to the requirements of the communication system, to interleave the data bits. Next, the adaptive hierarchical signal mapping module 105 modulates the interleaved and encoded signal. According to an embodiment of the invention, the adaptive hierarchical signal mapping module 105 may be an M-ary Quadrature Amplitude Modulation (M-QAM) modulator mapping the encoded signal to the modulated symbols according to a constellation to generate the modulated symbols, wherein M may be a power of 2. As an example, $M=2^N$, N is a positive integer. Therefore, a modulated symbol may comprise N bits.

After being converted by the serial to parallel converter 106, the modulated symbols are converted from frequency domain to time domain via the IFFT module 107, and passed to the parallel to serial converter 108. Finally, the guard period insertion device 109 inserts the Cyclic Prefix (CP) into the modulated symbols and the transceiver module 110 generates a radio frequency signal accordingly and transmits the radio frequency signal to an air interface. The guard period insertion device 109 inserts the CP into the modulated symbols by generating a replica of the tail of the modulated symbols and concatenating the replica to the beginning of the modulated symbols to form a Guard Interval (GI). In this manner, waveform continuity of the OFDM symbols may be maintained. The transceiver module 110 may comprise a mixer 111 to generate the radio frequency signal according to a carrier frequency $f_c$ provided by the oscillator 113, and transmit the radio frequency signal to the air interface via the antenna 112.

Figure 2:
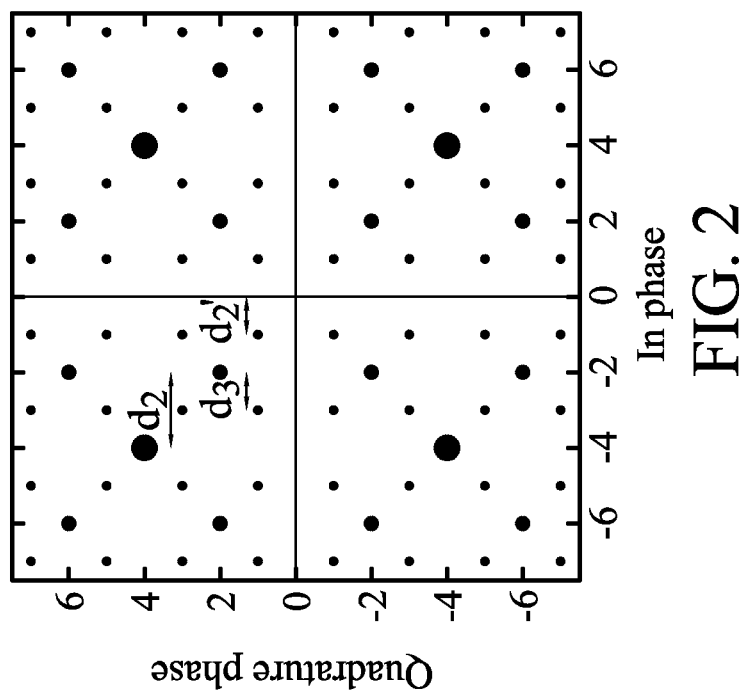
FIG. 2 shows an exemplary constellation for hierarchical modulation according to an embodiment of the invention.

As previously described, the adaptive hierarchical signal mapping module 105 generates the modulated symbols by mapping the encoded signal according to a constellation. FIG. 2 shows an exemplary constellation for hierarchical modulation according to an embodiment of the invention. As an example of a hierarchical 64-QAM, M=64 and N=6. Therefore, each modulated symbol generated by the 64-QAM modulation comprises 6 bits. FIG. 2 shows the constellation points for hierarchical modulation with three hierarchies, where there are two bits comprised in each hierarchy. The two bits of the first hierarchy determine positions of the biggest constellation points as shown in FIG. 2, where each constellation points determined by these two bits of the first hierarchy may be regarded as a Quadrature Phase Shift Keying (QPSK) modulation result. The two bits of the second hierarchy determine positions of the middle constellation points as shown in FIG. 2. The two bits of the third hierarchy determine positions of the smallest constellation points as shown in FIG. 2; that is, the final constellation points in a 64-QAM constellation.

According to an embodiment of the invention, in addition to hierarchically modulating the encoded signal, the adaptive hierarchical signal mapping module 105 further adjusts positions of the constellation points for hierarchical modulation in the constellation as shown in FIG. 2 according to one or more hierarchical level distance ratios (for example, $\lambda_1$ and $\lambda_2$) so as to adjust for non-uniformity of the distribution of the constellation points. The hierarchical level distance ratios $\lambda_1$ and $\lambda_2$ define distances between each constellation point. As shown in FIG. 2, the values $d_2'$, $d_2$ and $d_3$ respectively represents the parameters required to fully describe the distance between the constellation points, where the parameter $d_2$ defines the distance from the first hierarchy constellation points (the biggest constellation points) to the second hierarchy constellation points (the middle constellation points), the parameter $d_3$ defines the distance from the second hierarchy constellation points (the middle constellation points) to the third hierarchy constellation points (the smallest constellation points), and the parameter $d_2'$ defines the distance from the third hierarchy constellation points that are closest to the Y axis to the Y axis. The hierarchical level distance ratios may be expressed as below:

$$\lambda_1 = d_2/d_2' \qquad \text{Eq. (1)}$$

$$\lambda_2 = d_3/d_2' \qquad \text{Eq. (2)}$$

Figure 3B:
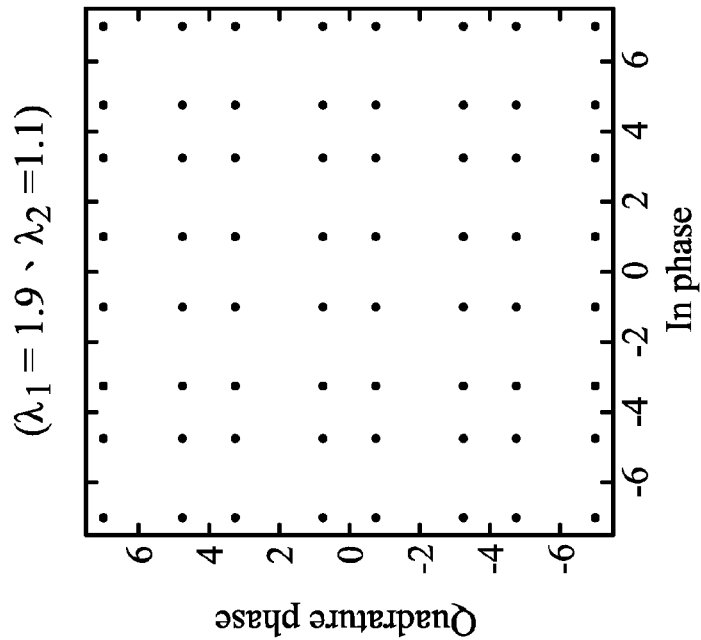
FIG. 3b shows an nearly uniformly distributed 64-QAM constellation according to an embodiment of the invention.
Figure 3A:
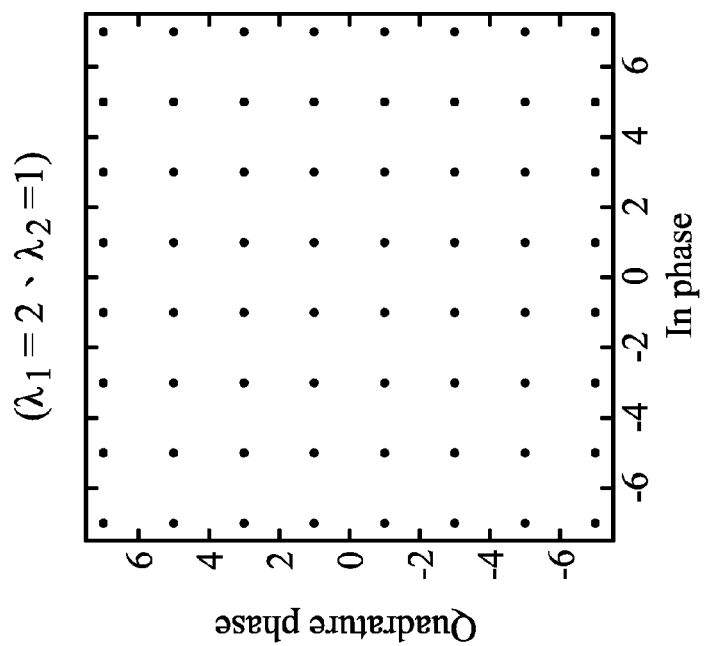
FIG. 3a shows a uniformly distributed 64-QAM constellation according to an embodiment of the invention.
Figure 3D:
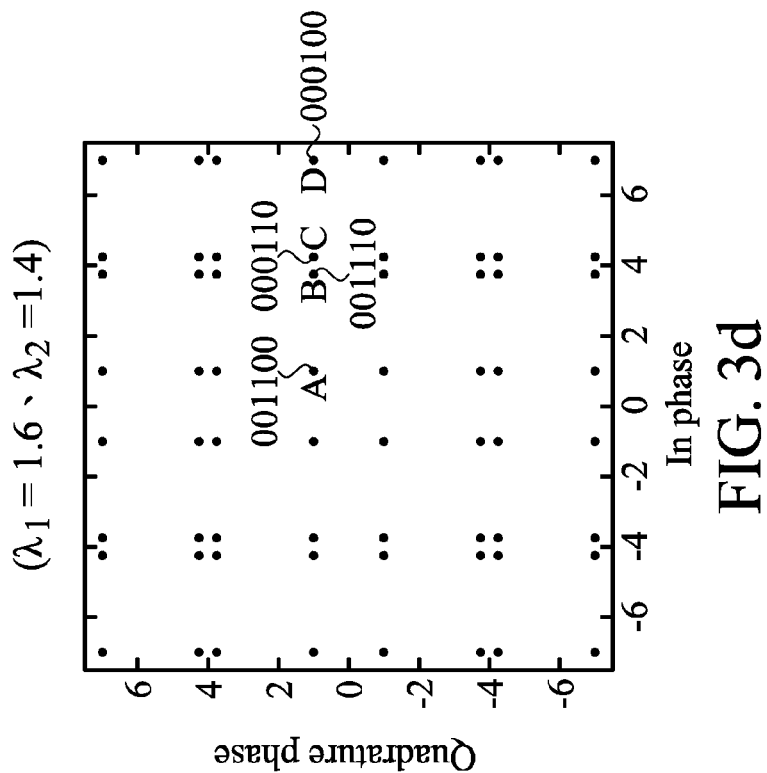
FIG. 3d shows a non-uniformly distributed 64-QAM constellation according to an embodiment of the invention.
Figure 3C:
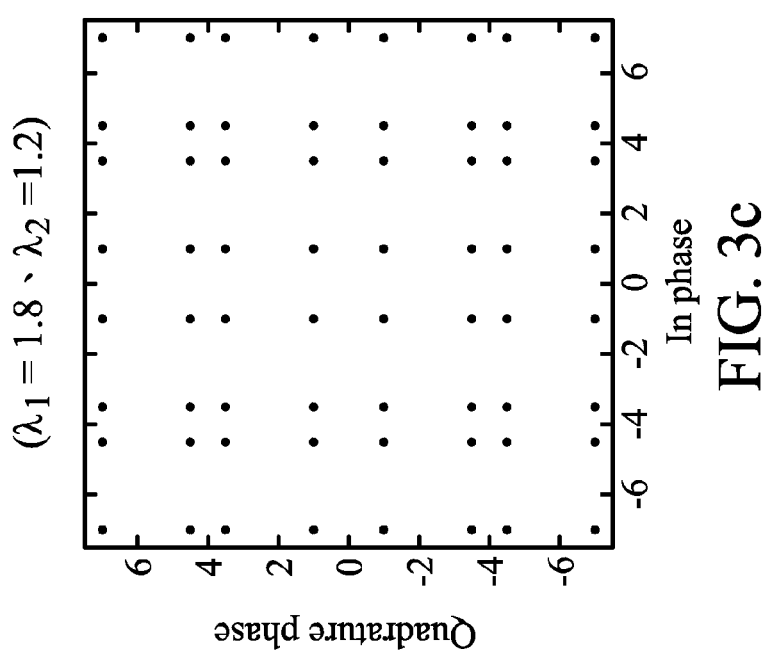
FIG. 3c shows a non-uniformly distributed 64-QAM constellation according to an embodiment of the invention.

FIGS. 3a-3d show exemplary constellations having different non-uniformities in distribution according to the embodiments of the invention. FIG. 3a shows a uniformly distributed 64-QAM constellation according to an embodiment of the invention, where $\lambda_1=2$ and $\lambda_2=1$ and the distances between any two constellation points are equivalent. FIG. 3b shows an nearly uniformly distributed 64-QAM constellation according to an embodiment of the invention, where $\lambda_1=1.9$ and $\lambda_2=1.1$ and the distances between two constellation points become slightly non-uniform. FIG. 3c shows a non-uniformly distributed 64-QAM constellation according to an embodiment of the invention, where $\lambda_1=1.8$ and $\lambda_2=1.2$ and the constellation points are non-uniformly distributed. FIG. 3d shows a non-uniformly distributed 64-QAM constellation according to an embodiment of the invention, where $\lambda_1=1.6$ and $\lambda_1=1.6$ and the non-uniformity of the constellation points are the most serious among the four constellations.

According to an embodiment of the invention, by adjusting values of the hierarchical level distance ratios $\lambda_{11}$ and $\lambda_2$, the bits in each hierarchy may have different error protection capabilities. As shown in FIG. 3d, based on the principle of Gray code encoding, the content of the modulated symbols A-D may be 001100, 001110, 000110 and 000100. As an example, when first two bits of the modulated symbols including the most significant bit (MSB) are designed as the two bits of the first hierarchy, the middle two bits of the modulated symbols are designed as the two bits of the second hierarchy, and the last two bits of the modulated symbols including the least significant bit (LSB) are designed as the two bits of the third hierarchy. Thus, it can be seen from FIG. 3d, that the non-uniform distribution of constellation points results in the worst error protection of data for the two bits of the second hierarchy. Based on different error protection capabilities of different hierarchies, the bit error rates (BER) of the corresponding bits in different hierarchies may have different properties under different signal to noise ratios (SNR) or different carrier frequency offsets (CFO) generated by the Doppler effect. By using the properties, once the BERs of the bits transmitted by the transmitter through the communication channel are obtained by the receiver, the extent or the amount of carrier frequency offset may be accurately estimated by analyzing the BERs of each hierarchy. Further, when the SNR of the communication system can not be specifically obtained, the SNR of the communication system may be estimated according to the BERs of each hierarchy. Details of the CFO and SNR estimation will be introduced in the following paragraphs.

According to an embodiment of the invention, the encoding module 102 may comprise a plurality of encoders 122. Each encoder 122 encodes a predetermined number of bits of the input signal, and a total number of the bits encoded by each encoder equals to the amount of bits comprised in a modulated symbol. As an example of 64-QAM hierarchical modulation, the encoding module 102 as shown in FIG. 1 may comprise 3 encoders 122. Each encoder 122 encodes two bits of the input signal. The encoder 122 may utilize the Cyclic Redundancy Check (CRC), Reed-Solomon code (RS code), Forward Error Correction code (FEC code), or any other encoding method that is capable of detecting the amount of error bits in the receiver.

Note that the embodiments introduced here are used to clearly describe the invention concept, and not to limit the scope of the claim. As an example, the concept of hierarchical modulation may not be limited to 64-QAM, which is described herein, and may be applied to other modulation schemes. In addition, the amount of hierarchies utilized for hierarchical modulation may be flexibly designed and different number of bits may be flexibly assigned to each hierarchy according to different rules. Those who are skilled in this technology can make various alterations and modifications to the hierarchical modulation scheme without departing from the scope and spirit of this invention. Therefore, the scope of the present invention shall be defined and protected by the following claims and their equivalents.

Receiver Structure

Figure 4:
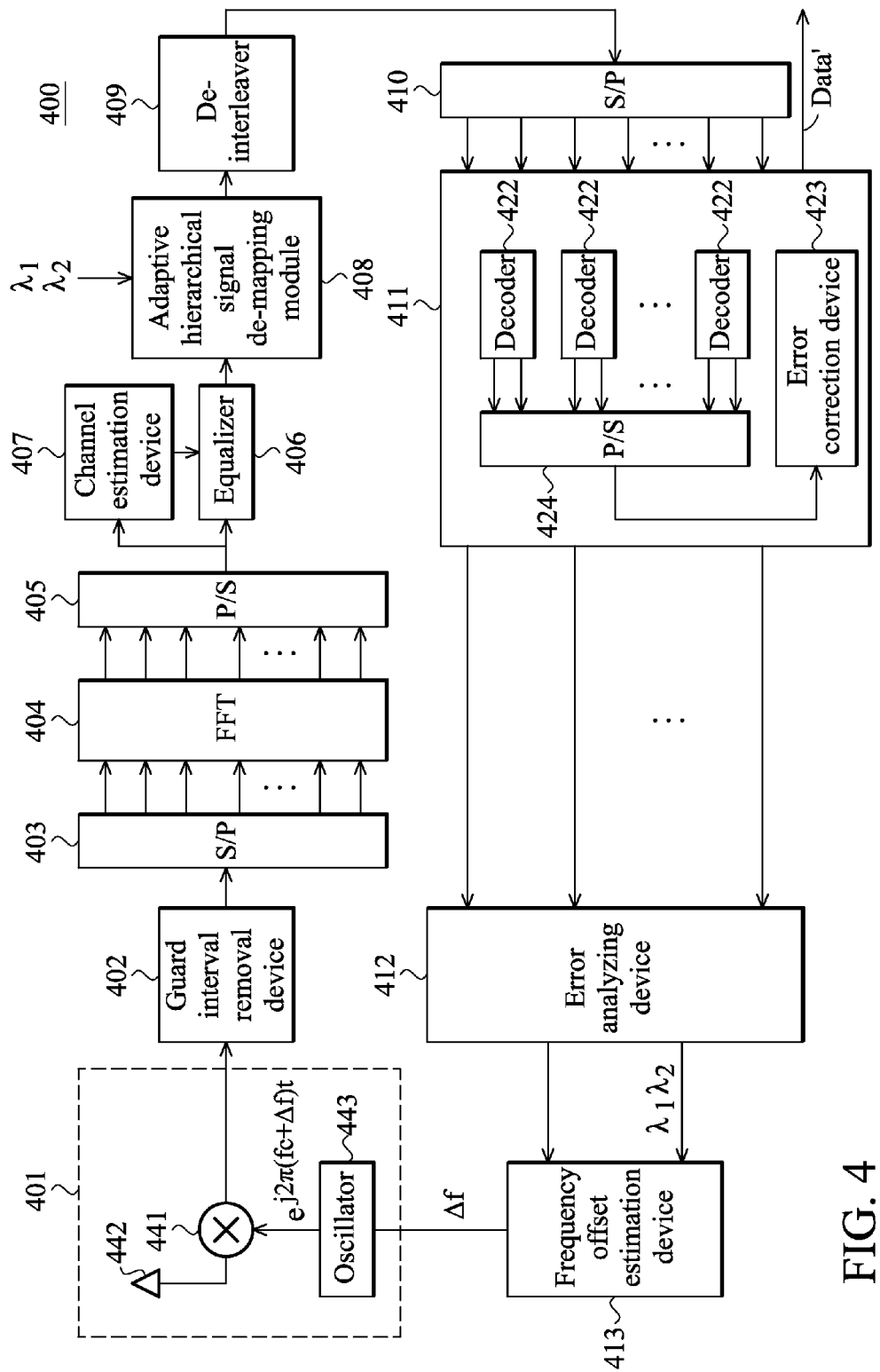
FIG. 4 shows a block diagram of a receiver according to an embodiment of the invention.
Figure 5A:
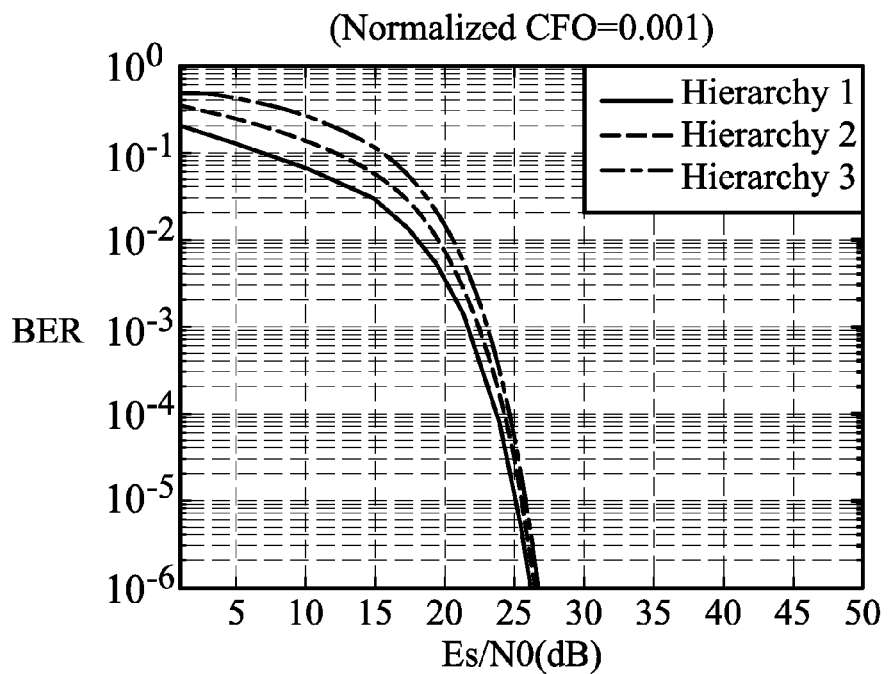
FIGS. 5a-5e show the BER curves of the bits in each hierarchy under uniform modulation according to an embodiment of the invention.
Figure 5B:
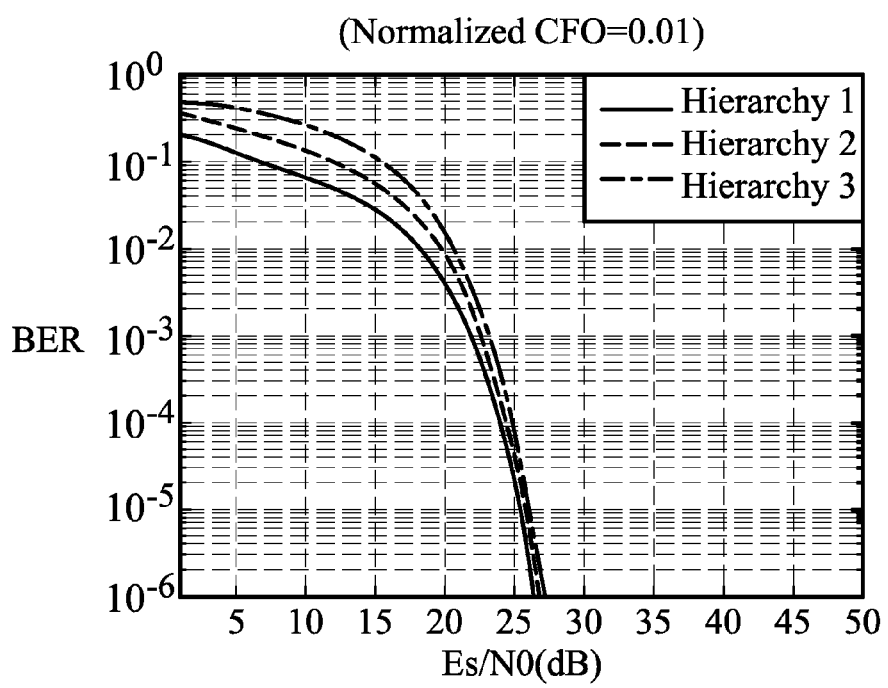
Figure 5C:
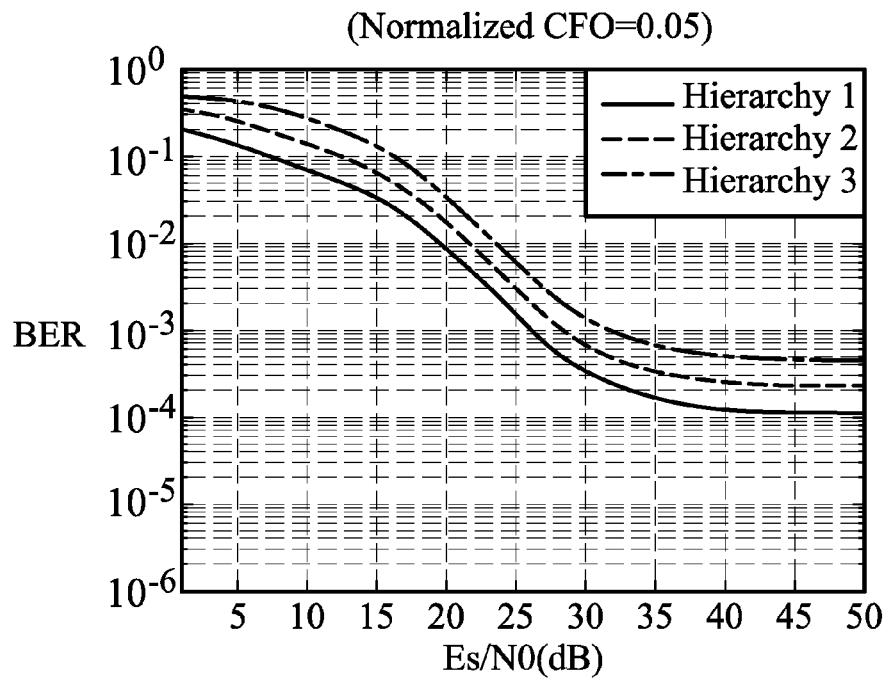
Figure 5D:
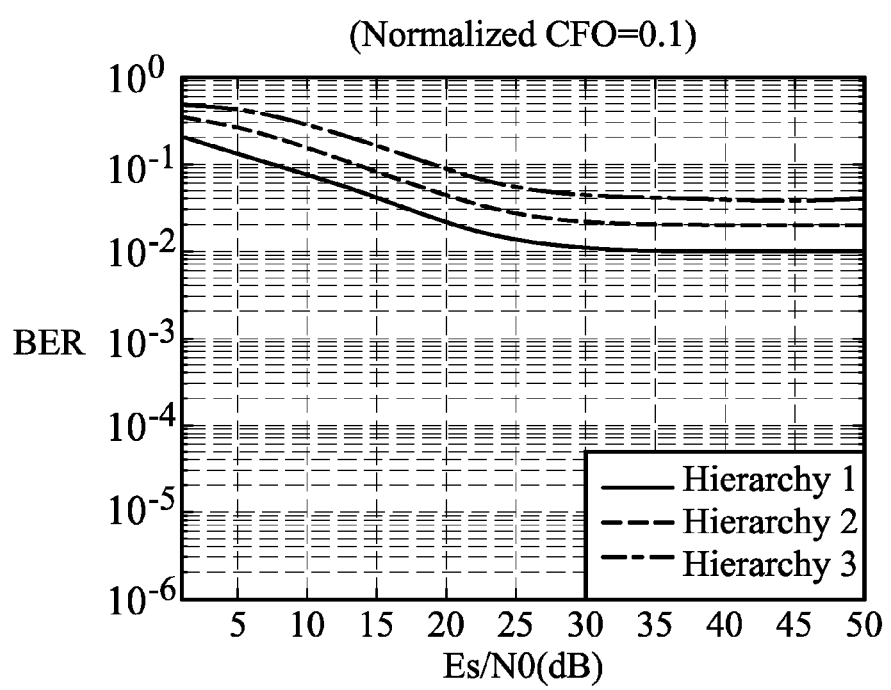
Figure 5E:
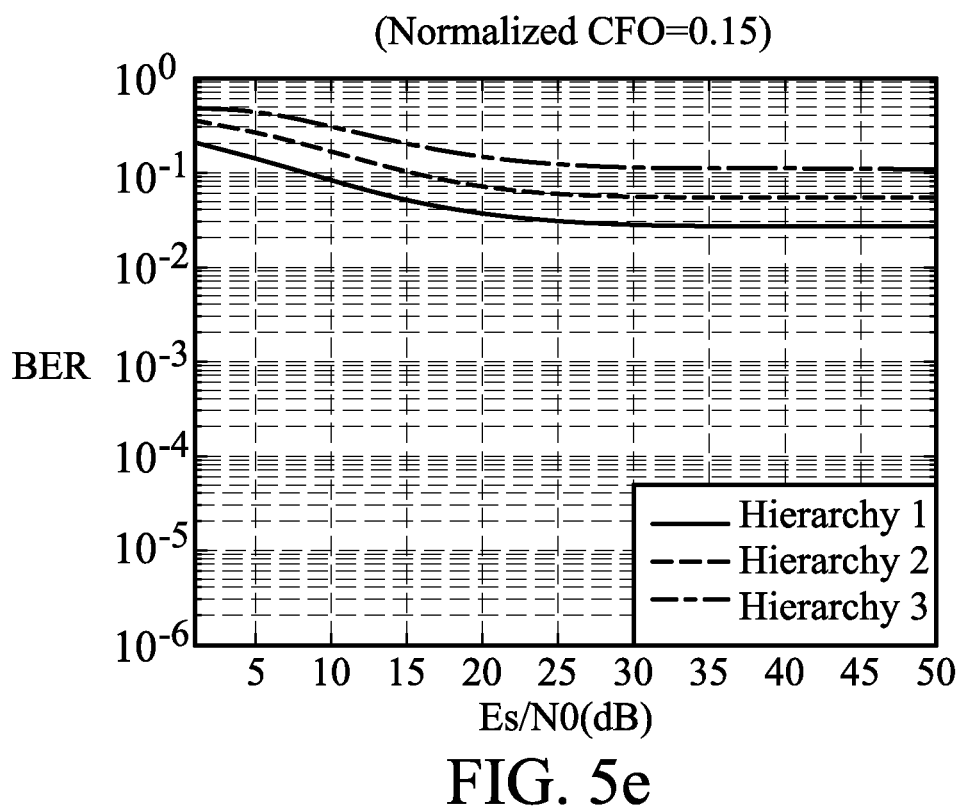

FIG. 4 shows a block diagram of a receiver 400 according to an embodiment of the invention. According to the embodiment of the invention, the receiver 400 may be utilized in the OFDM communication system. As shown in FIG. 4, the transmitter 400 comprises a transceiver module 401, a guard interval removal device 402, serial to parallel converters 403 and 410, parallel to serial converters 405 and 424, a Fast Fourier Transform (FFT) module 404, a equalizer 406, a channel estimation device 407, an adaptive hierarchical signal de-mapping module 408, a de-interleaver 409, a decoding module 411, an error analyzing device 412 and a frequency offset estimation device 413.

The transceiver module 401 comprises an antenna 442 receiving a radio frequency signal from the air interface, an oscillator 443 generating compensated carrier signal according to the carrier frequency $f_c$ and the CFO compensation factor $\Delta f$, and a mixer 441 converting the radio frequency signal to a baseband signal according to the compensated carrier signal. The guard interval removal device 402 removes the cyclic prefix (CP) inserted by the guard period insertion device 109, and the FFT module 404 converts the signal received from the parallel to serial converter 403 from time domain to frequency domain. The FFT transformed signal is converted to a serial signal via the parallel to serial converter 405. The equalizer 406 adjusts the gain of the signal to compensate for channel fading effect. The channel estimation device 407 estimates channel impulse response according to the pilot signals embedded in the signals so as to provide the channel impulse response to the equalizer 406 for compensation.

The adaptive hierarchical signal de-mapping module 408 de-maps the output signal of the equalizer according to a constellation to generate a plurality of demodulated symbols. According to an embodiment of the invention, the adaptive hierarchical signal de-mapping module 408 further adjusts non-uniformity of the distribution of the constellation points in the constellation according to one or more hierarchical level distance ratios (for example, $\lambda_1$ and $\lambda_2$). The hierarchical level distance ratios $\lambda_1$ and $\lambda_2$ define distances between each constellation point, and the parameters $\lambda_1$ and $\lambda_2$ may be synchronized with the adaptive hierarchical signal mapping module 105 in the transmitter. The de-interleaver 409 may be designed corresponding to the interleaver 104 in the transmitter according to system requirements so as to recover the interleaved bit order. After being converted by the serial to parallel converter 410, the de-interleaved signal enters the decoding module 411 for decoding.

According to an embodiment of the invention, the decoding module 411 may comprise a plurality of decoding paths, each corresponding to the encoding paths in the transmitter, so as to hierarchically decode the data symbols and generate a plurality of decoded signals in each decoding path. Each decoding path comprises a decoder 422 to decode a predetermined number of bits of the data symbols, and similar to the encoder 122, a total number of bits decoded by the decoders 422 equals to the amount of bits comprised in a data symbol. Take the 64-QAM hierarchical modulation as an example, the decoding module 411 may comprise 3 decoders 422. Each decoder 422 decodes 2 bits of the data symbols. In the embodiments of the invention, since the signals have been encoded by a specific error correction code, the decoder may further detect error bits in each data symbol to obtain the error bit information in each decoding path (i.e. each hierarchy).

The error correction device 423 corrects errors in the decoded signal to retrieve the data Data' originally transmitted by the transmitter and output the data as the output signal.

According to an embodiment of the invention, the error analyzing device 412 further receives error bit information of each decoding path from the decoding module 411 and estimates a bit error rate (BER) in each decoding path. The decoding module 411 and/or the error analyzing device 412 may comprise a plurality of data signal registers for storing the successively received data bits, and periodically compute the current BER of each hierarchy according to the error bit information. The registers may have predetermined capacities. When the amount of data received by the registers exceeds the predetermined capacity, old data may be discarded so that newly arrived data may be stored.

As previously described, because different BERs of the bits in each hierarchy may be obtained under different SNRs and/or different CFOs generated according to the Doppler effect, the error analyzing device 412 may analyze the change of BERs in each hierarchy so as to estimate the current CFO and the SNR of the communication system. The frequency offset estimation device 413 may further generate the CFO compensation factor $\Delta f$ according to the BER analyzing results. Note that the CFO compensation factor $\Delta f$ is a coarse estimation result. According to an embodiment of the invention, the CFO compensation factor $\Delta f$ may further be fed back to the transceiver module 401, where the oscillator 413 may be a Numerically Controlled Oscillator (NCO) that can estimate a finer CFO value according to the CFO compensation factor $\Delta f$ and output the estimation result to the mixer 411 so as to instantaneously compensate for carrier frequency offset of the communication channel. In addition, according to an embodiment of the invention, the error analyzing device 412 may further adjust the hierarchical level distance ratios $\lambda_1$ and $\lambda_2$ according to the BER, analyzing results and transmitting the adjusted hierarchical level distance ratios $\lambda_1$ and $\lambda_2$ to the modulation device of the transmitter, such as the adaptive hierarchical signal mapping module 105 shown in FIG. 1, via the transceiver module 401. The hierarchical signal mapping module 105 shown in FIG. 1 may receive the feedback hierarchical level distance ratios $\lambda_1$ and $\lambda_2$ via the transceiver module 110, and adjust the non-uniformity of the distribution of the constellation points in the constellation according to the feedback hierarchical level distance ratios $\lambda_1$ and $\lambda_2$.

Analyzing Bit Error Rate

FIGS. 5a-5e show the Bit Error Rate (BER) curves of the bits in each hierarchy under uniform modulation according to an embodiment of the invention. In the embodiment of the invention, 64-QAM hierarchical modulation is utilized, and the BER analyzing process is performed on three hierarchies of a modulated symbol as previously described. Therefore, three BER curves as show in the figures may be obtained. FIG. 5a to FIG. 5e respectively shows the BER curves of the bits in three hierarchies under normalized CFOs of 0.001, 0.01, 0.05, 0.1 and 0.15 when utilizing uniform modulation and $\lambda_1=2$ and $\lambda_2=1$. . The X-axis represents the SNR of Eb/NO, and the Y-axis represents the BER. As shown in FIGS. 5a to 5e, since the modulated symbols are uniformly distributed in the constellation, the relationship between the error rates of the bits in each hierarchy does not vary with the change of the carrier frequency offset. Therefore, no matter what the normalized CFO is, the relationship between the error rates of the bits in each hierarchy is always maintained so that the BER of hierarchy 1 is larger than the BER of hierarchy 2, and the BER of hierarchy 2 is larger than the BER of hierarchy 3. In this manner, the BER curves of each hierarchy do not cross with each other, and thus, there is no cross point generated. In addition, it can be seen from FIG. 5a to FIG. 5e, that the distance between the Error Floor in the BER curves of different hierarchies does not vary with the changes of the CFO. The Error Floor is a physical phenomenon representing that the BER does not approach 0 as the SNR improves. As can be seen from the figures, as the CFO increases, the Error Floor occurs earlier (i.e. at a smaller SNR) than a smaller CFO.

FIGS. 6a to 6e show the BER curves of the bits in each hierarchy under nearly uniform modulation according to an embodiment of the invention. In the embodiments of the invention, 64-QAM hierarchical modulation is utilized and $\lambda_1=1.9$ and $\lambda_2=1.1$ (reference may be made to FIG. 3b). As previously described, the data bits in a modulated symbol may be divided into three hierarchies for the BER analyzing process and therefore, three BER curves may be obtained as shown in the figures. FIG. 6a to FIG. 6e respectively shows the BER curves of the bits in three hierarchies under normalized CFOs of 0.001, 0.01, 0.05, 0.1 and 0.15 when utilizing nearly uniform modulation, where the X-axis represents the SNR of Eb/NO, and the Y-axis represents the BER.

Figure 6A:
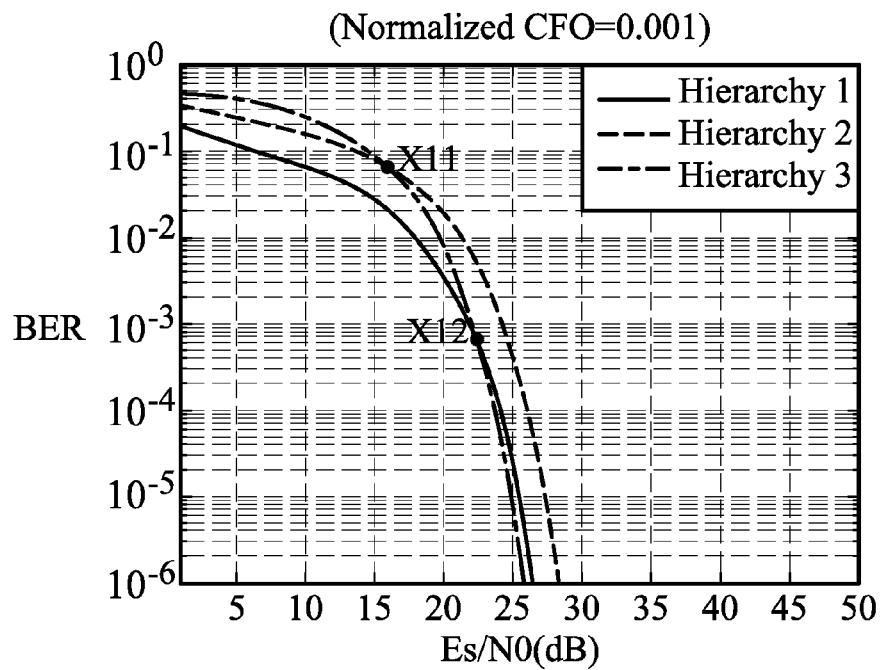
FIGS. 6a-6e show the BER curves of the bits in each hierarchy under nearly uniform modulation according to an embodiment of the invention.

As previously described, because the symbols become non-uniformly distributed in the constellation, different error protection capabilities of the bits in different hierarchies result. Therefore, the BERs of the bits in different hierarchies are different. In addition, when the constellation points are non-uniformly distributed, the relationship between the error rates of the bits in each hierarchy may vary as the SNR and CFO change. As shown in FIG. 6a, when the normalized CFO=0.01 and SNR<16 dB, the error protection capability of hierarchy 3 is the worst (i.e. the BER is highest) among the three hierarchies, followed by the hierarchy 2, and finally the hierarchy 1 which has the best error protection capability. When the SNR is between 16 and 22 dB, the error protection capability of each hierarchy changes and the relationship becomes, from the worst one to the best one (i.e. from the hierarchy having the highest BER to the hierarchy having the lowest BER), hierarchy 2, hierarchy 3 and hierarchy I. When the SNR exceeds 22 dB, the error protection capability of each hierarchy changes again and the relationship becomes, from the worst one to the best one, hierarchy 2, hierarchy 1 and hierarchy 3.

Figure 6B:
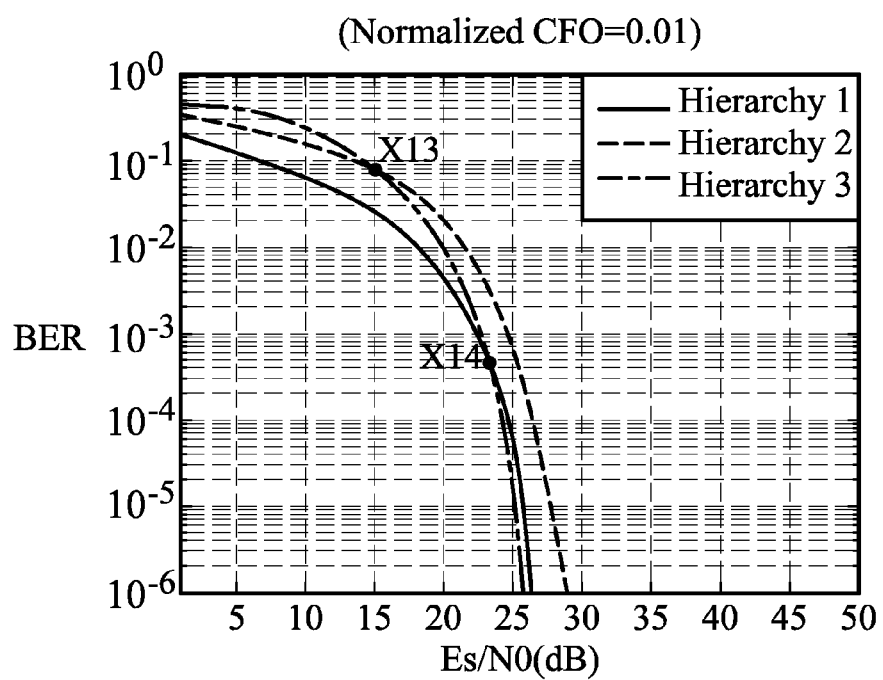
Figure 6C:
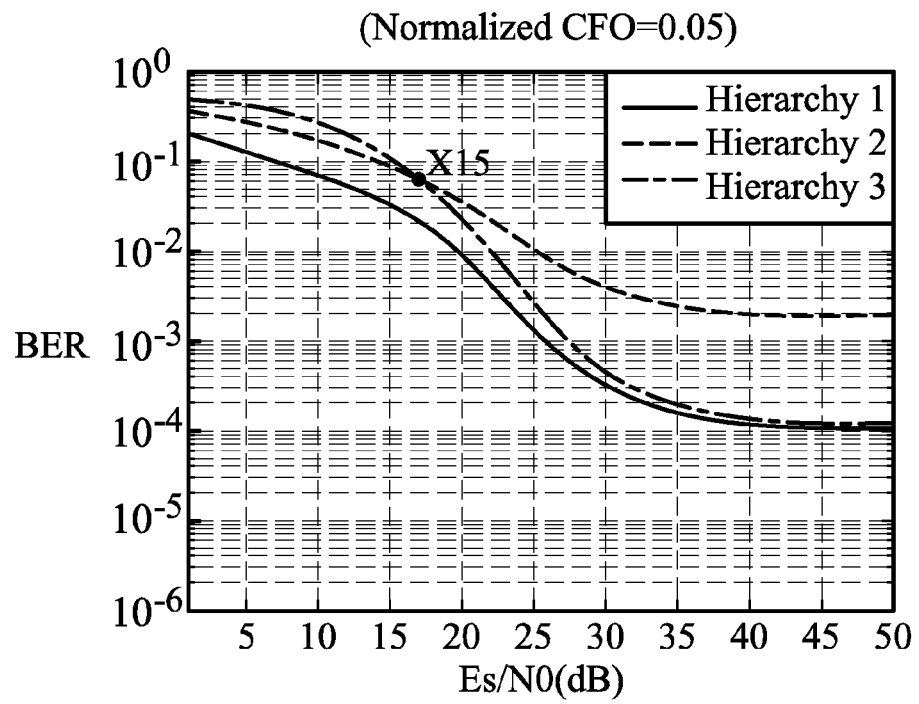
Figure 6D:
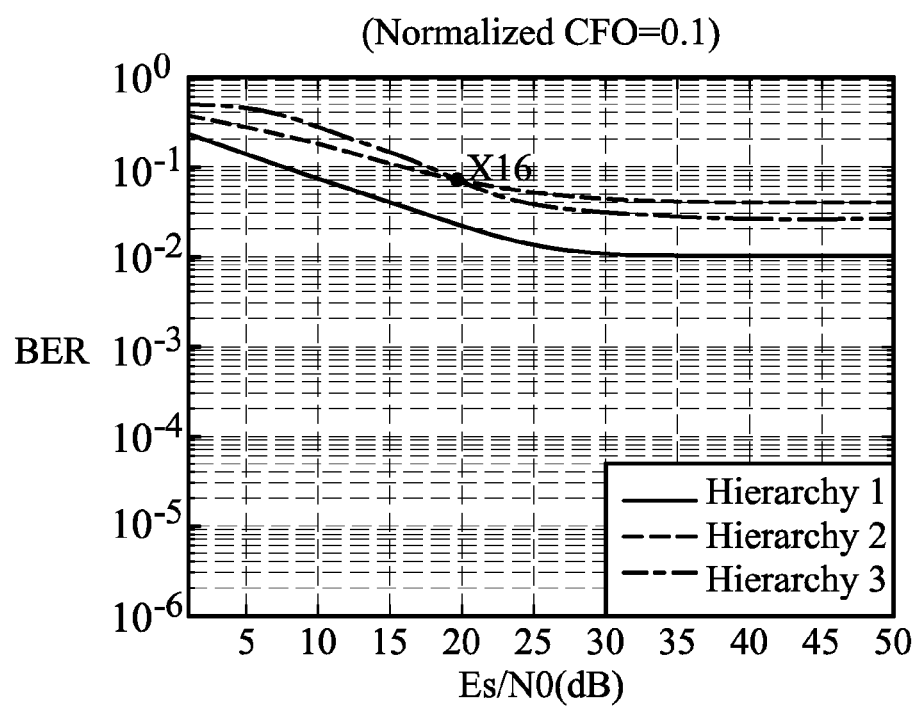
Figure 6E:
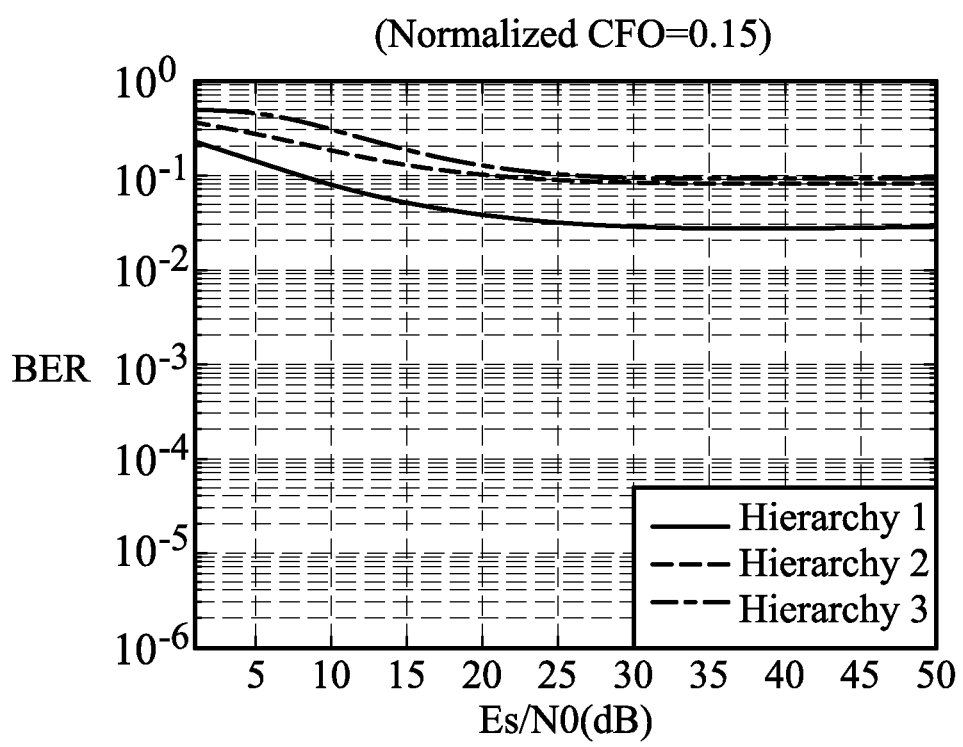

Because the error protection capability corresponding to each hierarchy may change under different channel conditions, the BER of each hierarchy may have different properties. As an example, the relationship between the BERs of each hierarchy may change as the SNR and/or CFO change. Once the relationship between the BERs of each hierarchy reverses, the BER curves may cross with each other and therefore, cross points X11 to X16 as shown in FIG. 6a to FIG. 6e may be generated. In addition, as shown in FIG. 6a to FIG. 6e, the distance between the Error Floors of each hierarchy may also change as the CFO changes, so as to change the amount of cross points. As shown in FIG. 6b and FIG. 6c, when the CFO changes from 0.01 to 0.05, the amount of cross points changes from two (two cross points X13 and X14) to one (one cross point X15).

FIGS. 7a to 7e show the BER curves of the bits in each hierarchy under non-uniform modulation according to an embodiment of the invention. In the embodiment, 64-QAM hierarchical modulation is utilized and $\lambda_1=1.8$ and $\lambda_2=1.2$ (reference may be made to FIG. 3c). As previously described, the data bits in a modulated symbol may be divided into three hierarchies for the BER analyzing process and therefore, three BER curves may be obtained as shown in the figures. FIG. 7a to FIG. 7e respectively shows the BER curves of the bits in three hierarchies under normalized CFOs of 0.001, 0.01, 0.05, 0.1 and 0.15 when utilizing non-uniform modulation, where the X-axis represents the SNR of Eb/NO, and the Y-axis represents the BER.

Figure 7A:
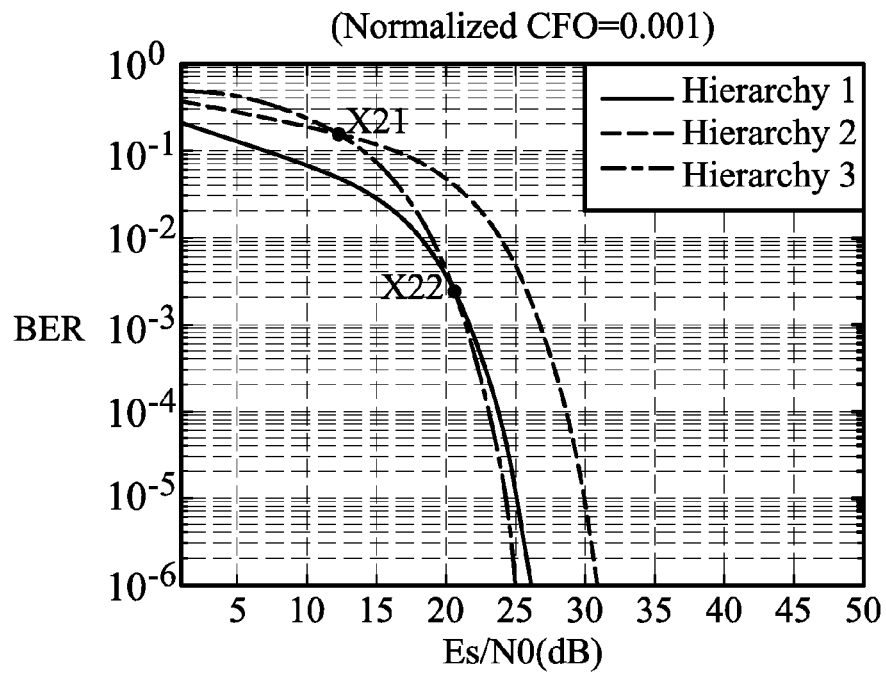
FIGS. 7a-7e show the BER curves of the bits in each hierarchy under non-uniform modulation according to an embodiment of the invention.
Figure 7B:
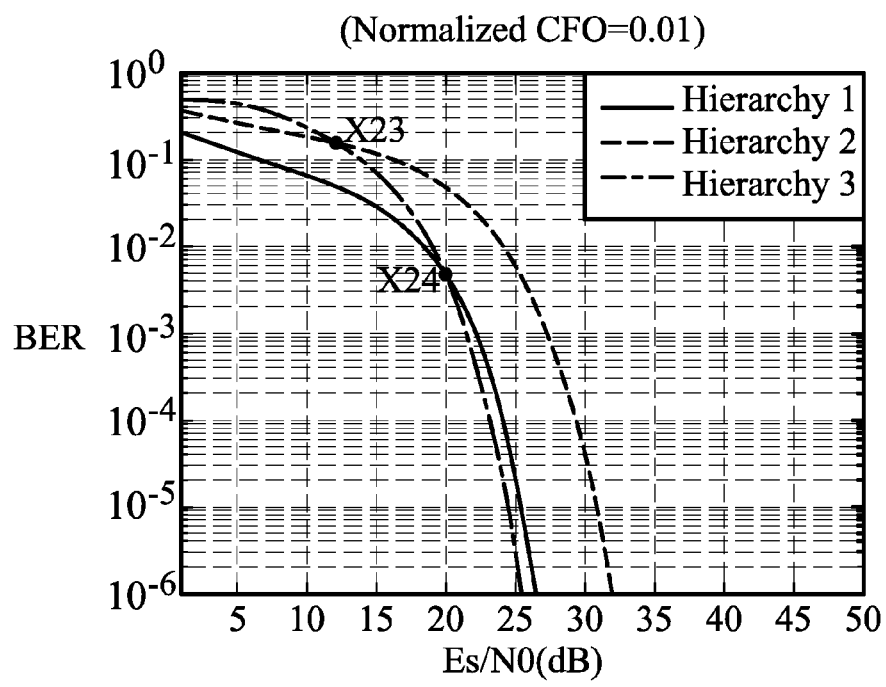
Figure 7C:
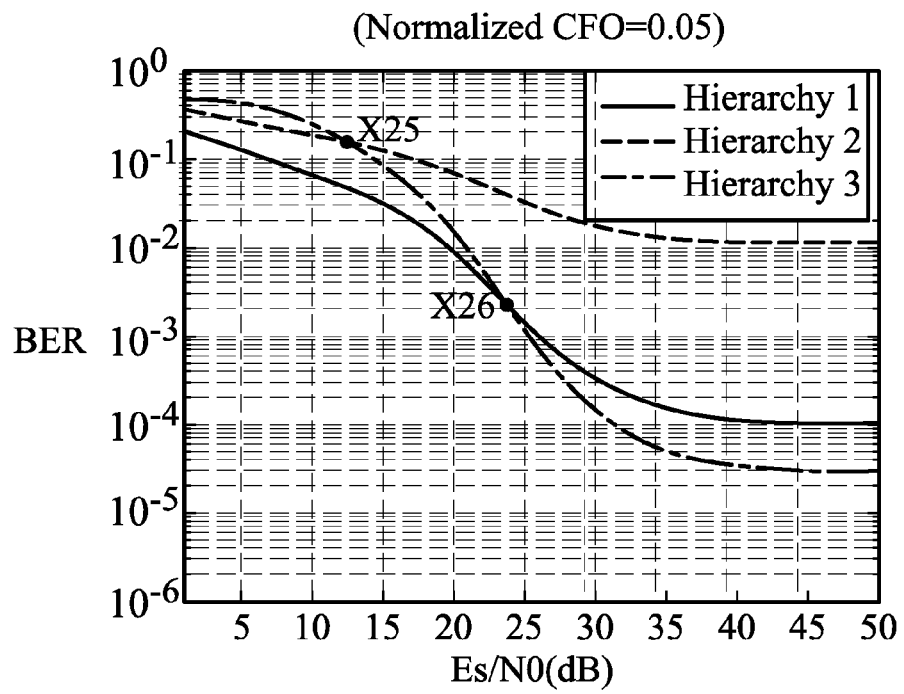

As previously described, because the symbols are non-uniformly distributed in the constellation, resulting in different error protection capabilities of the bits in different hierarchies, and the relationship between the error rates of the bits in each hierarchy may vary as the SNR and CFO change. As shown in FIG. 7c, when the normalized CFO=0.05 and SNR<13 dB, the error protection capability of hierarchy 3 is the worst one (i.e. the BER is the highest) among the three hierarchies, followed by the hierarchy 2, and finally the hierarchy 1 which has the best error protection capability. When the SNR is between 13 and 24 dB, the error protection capability of each hierarchy changes and the relationship becomes, from the worst one to the best one (i.e. from the hierarchy having the highest BER to the hierarchy having the lowest BER), hierarchy 2, hierarchy 3 and hierarchy 1. When the SNR exceeds 24 dB, the error protection capability of each hierarchy changes again the relationship becomes to, from the worst one to the best one, hierarchy 2, hierarchy 1 and hierarchy 3.

Figure 7D:
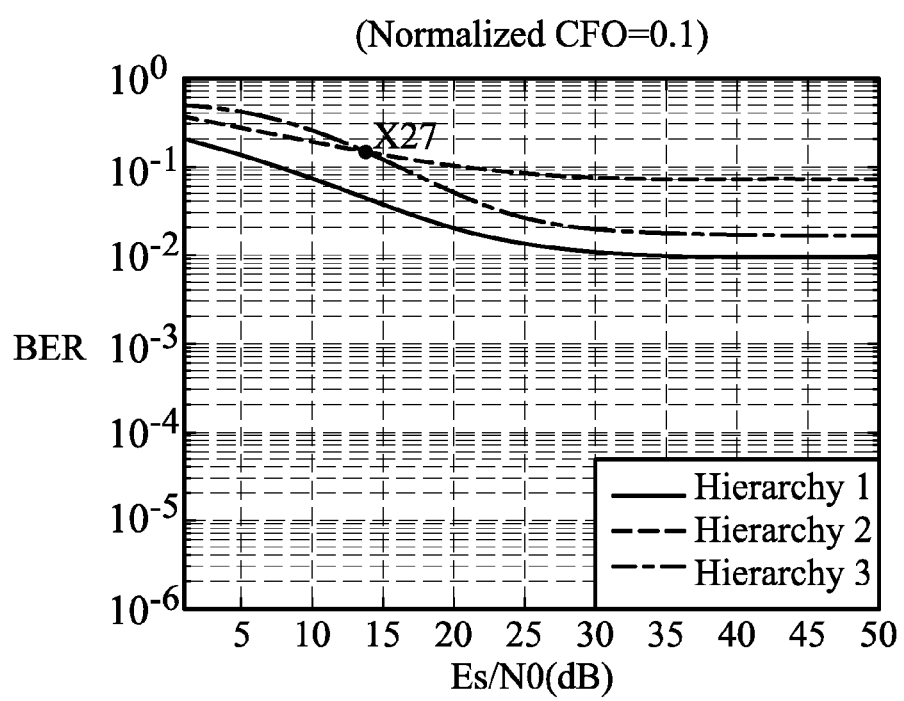
Figure 7E:
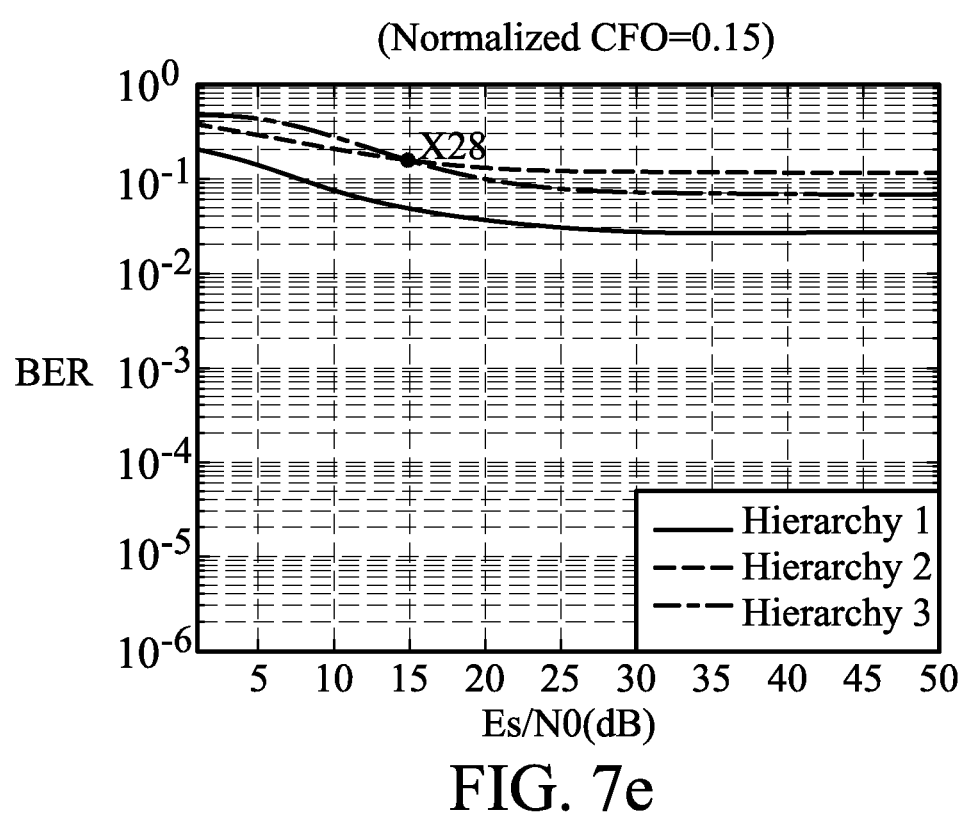

Because the error protection capability corresponding to each hierarchy may change under different channel conditions, so that the relationship between the BERs of each hierarchy to change accordingly. Therefore, the cross points X21 to X28 as shown in FIG. 7a to FIG. 7e may be generated when the BER curves cross with each other due to the change in the BER relationship. In addition, as shown in FIG. 7a to FIG. 7e, the distance between the Error Floors of each hierarchy may also change as the CFO changes, so as to change the amount of cross points. As shown in FIG. 7c and FIG. 7d, when the CFO changes from 0.05 to 0.1, the amount of cross points changes from two (two cross points X25 and X26) to one (one cross point X27).

FIGS. 8a to 8e show the BER curves of the bits in each hierarchy under non-uniform modulation according to an embodiment of the invention. In the embodiment, 64-QAM hierarchical modulation is utilized and $\lambda_1$=1.6 and $\lambda_2$=1.4 (reference may be made to FIG. 3d). As previously described, the data bits in a modulated symbol may be divided into three hierarchies for the BER analyzing process and therefore, three BER curves may be obtained as shown in the figures. FIG. 8a to FIG. 8e respectively show the BER curves of the bits in three hierarchies under normalized CFOs of 0, 1/16, 1/8, 1/4 and 1/2 when utilizing non-uniform modulation, where the X-axis represents the SNR of Eb/NO, and the Y-axis represents the BER.

Figure 8A:
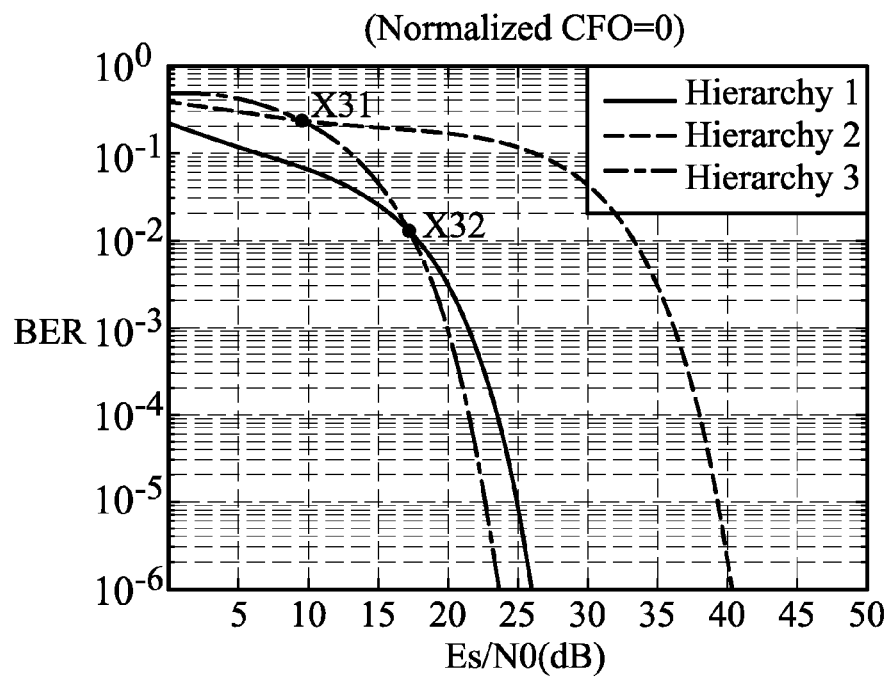
FIGS. 8a-8e show the BER curves of the bits in each hierarchy under non-uniform modulation according to an embodiment of the invention.
Figure 8B:
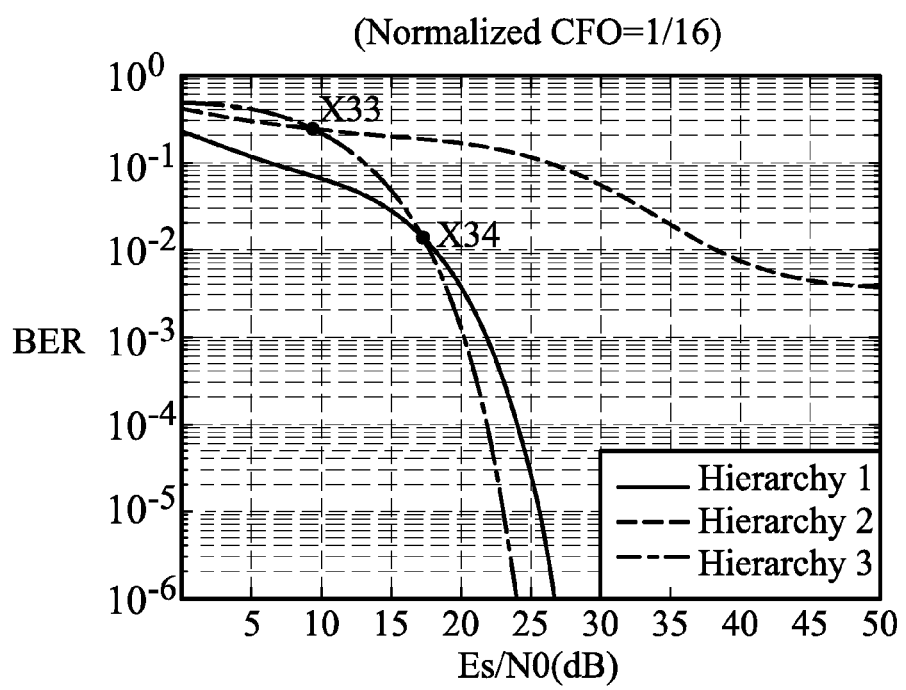
Figure 8C:
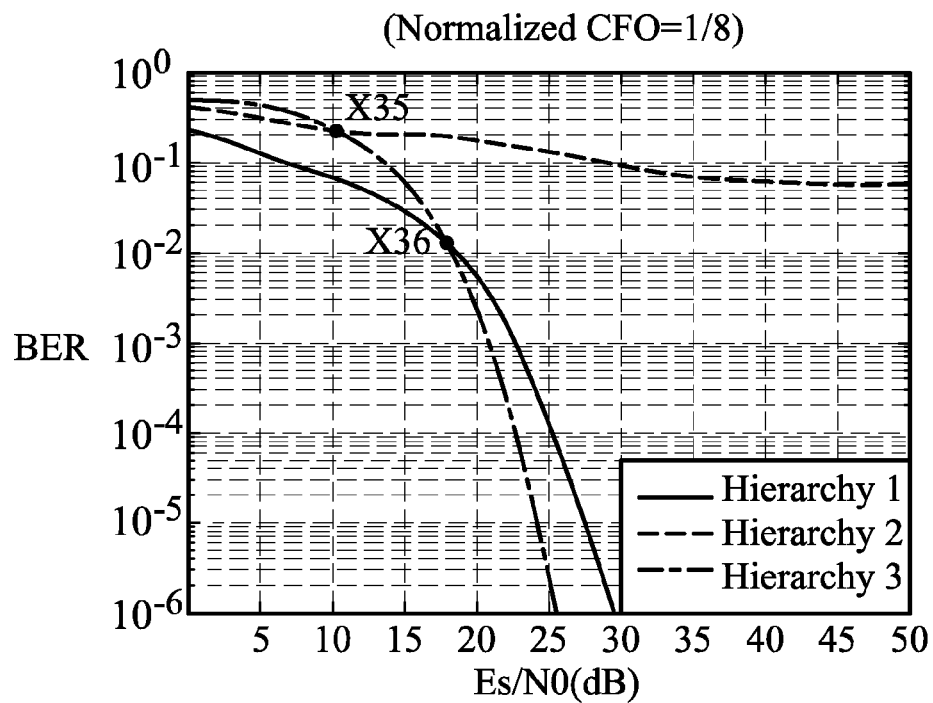
Figure 8D:
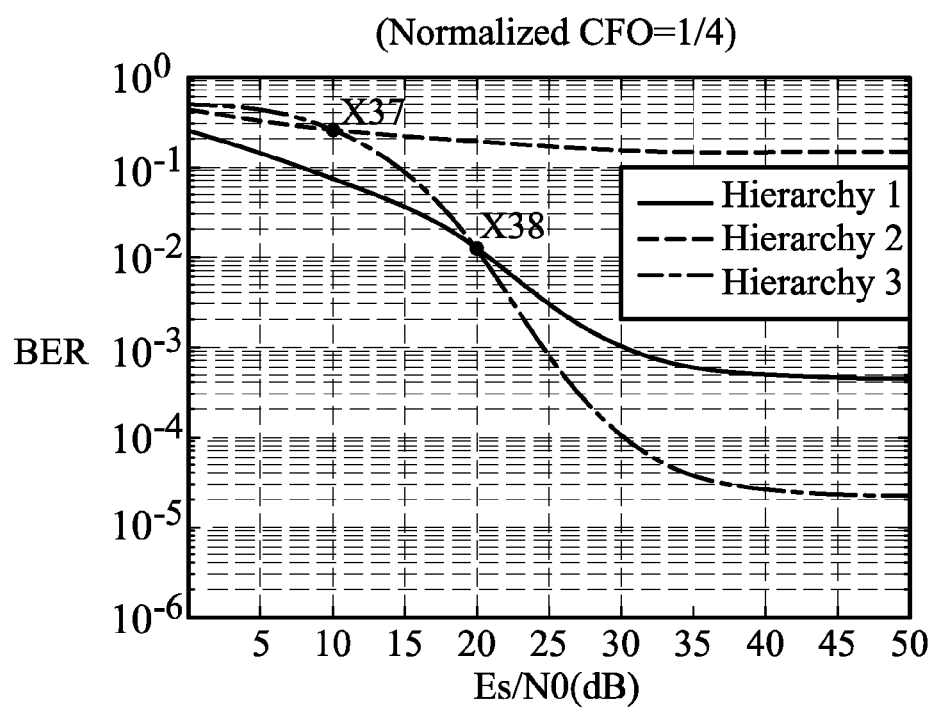

As previously described, because the symbols are non-uniformly distributed in the constellation, different error protection capabilities of the bits in different hierarchies may result and the relationship between the error rates of the bits in each hierarchy may vary as the SNR and CFO change. As shown in FIG. 8d, when the normalized CFO=0.25 and SNR<10 dB, the error protection capability of hierarchy 3 is the worst one (i.e. the BER is highest) among the three hierarchies, followed by the hierarchy 2, and finally the hierarchy 1 which has the best error protection capability. When the SNR is between 10 and 20 dB, the error protection capability of each hierarchy changes and the relationship becomes, from the worst one to the best one (i.e. from the hierarchy having the highest BER to the hierarchy having the lowest BER), hierarchy 2, hierarchy 3 and hierarchy 1. When the SNR exceeds 20 dB, the error protection capability of each hierarchy changes again and the relationship becomes, from the worst one to the best one, hierarchy 2, hierarchy 1 and hierarchy 3.

Figure 8E:
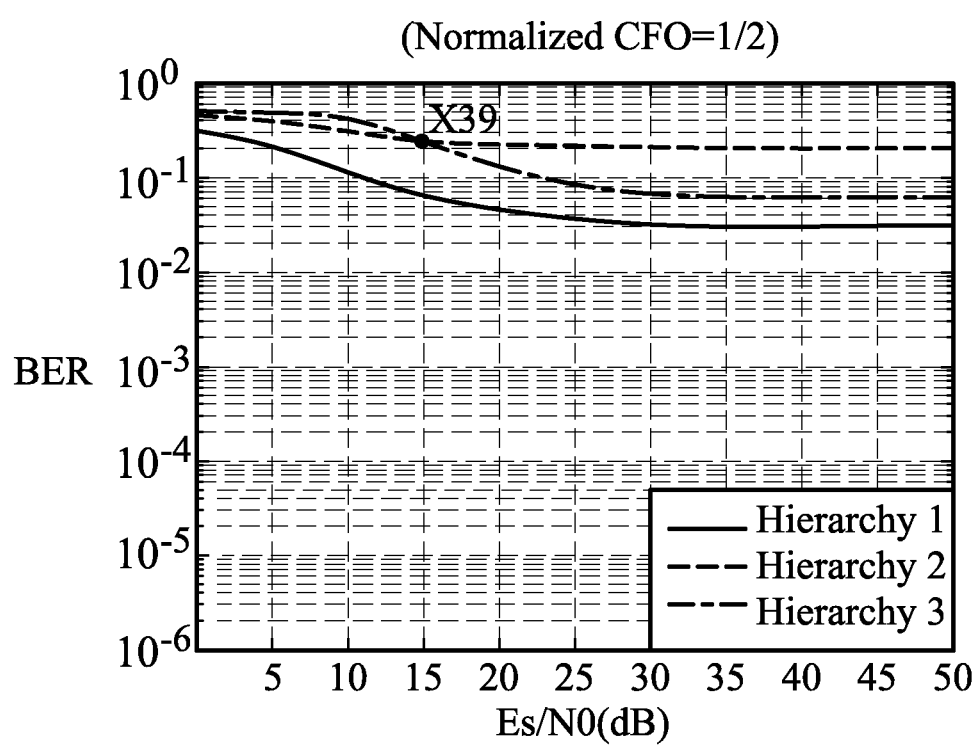

Because the error protection capability corresponding to each hierarchy may change under different channel conditions, so that the relationship of the BER of each hierarchy to change accordingly. Therefore, the cross points X31 to X39 as shown in FIG. 8a to FIG. 8e may be generated. In addition, as shown in FIG. 8a to FIG. 8e, the distance between the Error Floors of each hierarchy may also change as the CFO changes, so as to change the amount of cross points. As shown in FIG. 8d and FIG. 8e, when the CFO changes from 0.25 to 0.5, the amount of cross points changes from two (two cross points X37 and X38) to one (one cross point X39).

As can be seen from FIG. 5 to FIG. 8, when the extent of the non-uniformity of the constellation increases, the characteristic of the BER curves crossing, becomes more significant. Therefore, each modulated symbol may carry more information of the channel characteristics. In this way, it is easier for the error analyzing device 412 to estimate the amount of carrier frequency offset according to the BER of each hierarchy. However, the overall error rate also increases as the extent of non-uniformity of the distribution of the constellation points increases. Thus, an acceptable tradeoff may be determined, between the signal quality and the amount of channel information that can be carried by the modulated symbols.

Adaptive Hierarchical Modulation

Figure 9:
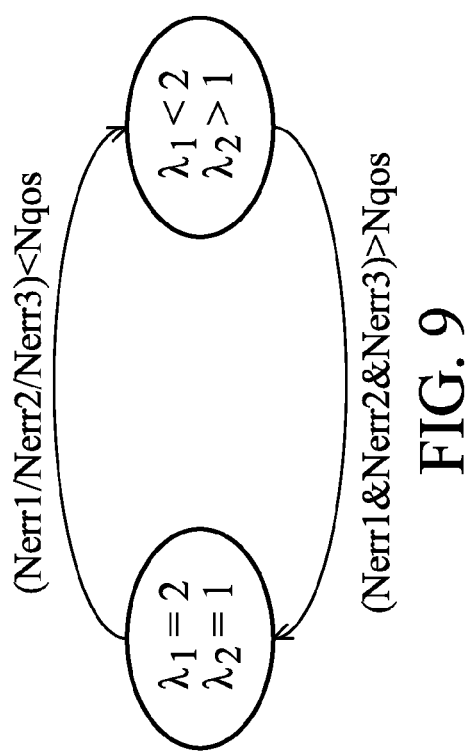
FIG. 9 shows a state machine according to an embodiment of the invention.

According to an embodiment of the invention, in order to satisfy the error rate requirement of a communication system while maintaining the capability for estimating the amount of carrier frequency offset of the received data, the parameters for hierarchical modulation may be adaptively changed according to different channel conditions. Therefore, the amount of carrier frequency offset may be estimated while the error rate requirement of the communication system is satisfied. FIG. 9 shows a state machine according to an embodiment of the invention. Assuming that Nqos is the minimum error rate requirement of the communication system, and Nerd, Nerr2 and Nerr3 respectively represents the BER of the three hierarchies: hierarchy 1, hierarchy 2 and hierarchy 3. When the BER of the three hierarchies all exceed the minimum error rate requirement Nqos, it means that the channel condition is bad (i.e. the SNR is low), and therefore the BER is high, or means that the extent of the carrier frequency offset is serious enough so that even if the SNR is high, the BER can not be decreased as the SNR increases. Thus, because the most important mission of the system requirement is to satisfy the minimum error rate of the communication system, the error analyzing device 412 adjusts the hierarchical level distance ratios as $\lambda_1$=2 and $\lambda_2$=1, and feedbacks the adjusted hierarchical level distance ratios to the transmitter. The adaptive hierarchical signal mapping module 105 may modulate the data according to a uniform constellation so that the bits in each hierarchy may have the best error protection capability. On the other hand, when any one of the BERs of the three hierarchies is smaller than the minimum error rate requirement Nqos of the communication system, the error analyzing device adjusts the hierarchical level distance ratios to $\lambda_1$<2 and $\lambda_2$>1, and feedbacks the adjusted hierarchical level distance ratios to the transmitter. The adaptive hierarchical signal mapping module 105 may modulate the data according to a non-uniform constellation thereafter. Through the non-uniformly distributed constellation points, the data symbols received by the receiver may carry plenty of information regarding channel characteristics. Therefore, the error analyzing device 412 may obtain the information regarding the carrier frequency offset according to the BER of each hierarchy, estimate the extent (i.e. the amount) of carrier frequency offset, and further feedback the CFO compensation factor $\Delta f$ to the transceiver module 401 so as to instantaneously compensate for the carrier frequency of the communication channel according to the CFO compensation factor $\Delta f$.

Figure 10:
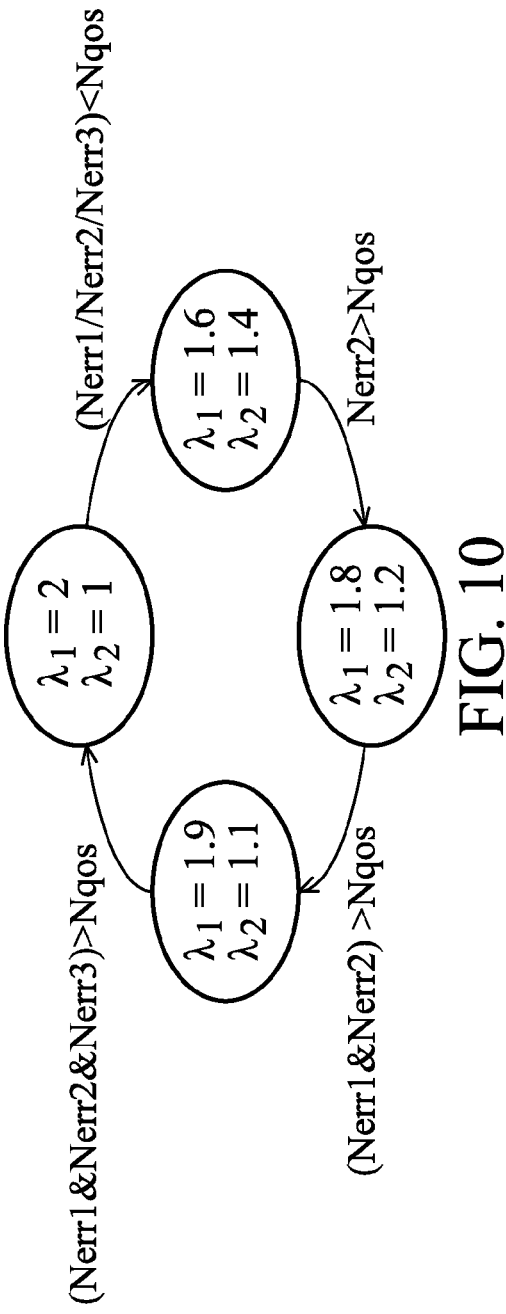
FIG. 10 shows a state machine according to an embodiment of the invention.

FIG. 10 shows a state machine according to another embodiment of the invention. In the embodiment, an example of how to adjust the hierarchical level distance ratios is introduced. As shown in FIG. 10, when any one of the BERs of the three hierarchies satisfies the minimum error rate requirement of the communication system; that is, when any one of the Nerr1, Nerr2 and Nerr3 is smaller than Nqos, it means that the channel condition is good. The error analyzing device 412 may change the hierarchical level distance ratios so as to make the constellation points to be non-uniformly distributed in the constellation. As an example, when Nerr1, Nerr2 and Nerr3 are all smaller than Nqos, the hierarchical level distance ratios may be adjusted to $\lambda_1=1.6$ and $\lambda_2=1.4$, so that the distribution of the constellation points become extremely non-uniform. Although non-uniformity of the distribution of the constellation points may increase overall error rates, a large amount of information regarding the carrier frequency offset may be carried in the error rates in each hierarchy. The error analyzing device 412 may obtain the information regarding the carrier frequency offset by analyzing the properties of the error rates in each hierarchy so as to estimate the amount of carrier frequency offset.

When the error rate Nerr2 does not satisfy the minimum error requirement of the communication system, the error analyzing device 412 may adjust the hierarchical level distance ratios to $\lambda_1=1.8$ and $\lambda_2=1.2$, so as to increase the uniformity of the distribution of the constellation points and thereby decrease the error rate. Note that although the distribution of the constellation points becomes less non-uniform than before, the information regarding the carrier frequency offset may still be carried in the BERs. When both the error rates Nerr2 and Nerr1 do not fulfill the minimum error requirement of the communication system, the error analyzing device 412 may adjust the hierarchical level distance ratios to $\lambda_1=1.9$ and $\lambda_2=1.1$, so as to make the constellation points become nearly uniformly distributed in the constellation and further decrease the error rate. Note that although the distribution of the constellation points becomes less non-uniform than before, the information regarding the carrier frequency offset may still be carried in the BERs. Finally, when all of the error rates Nerr1, Nerr2 and Nerr3 do not satisfy the minimum error requirement of the communication system, the error analyzing device 412 may adjust the hierarchical level distance ratios to $\lambda_1=2$ and $\lambda_2=1$ so as to make the constellation points become uniformly distributed in the constellation. Therefore, the best BERs may be obtained and the minimum error requirement of the communication system may be satisfied.

Carrier Frequency Offset (CFO) and CFO Estimation

As previously described, the non-uniformity of the distribution of the modulated symbols may result in multiple cross points being generated by the BER curves of each hierarchy in the figures. Therefore, the error analyzing device 412 may estimate a current amount of carrier frequency offset by analyzing the BERs of each hierarchy, and further feedback the CFO compensation factor $\Delta f$ to the transceiver module 401 so as to instantaneously compensate for the carrier frequency of the communication channel according to the CFO compensation factor $\Delta f$.

Figure 11:
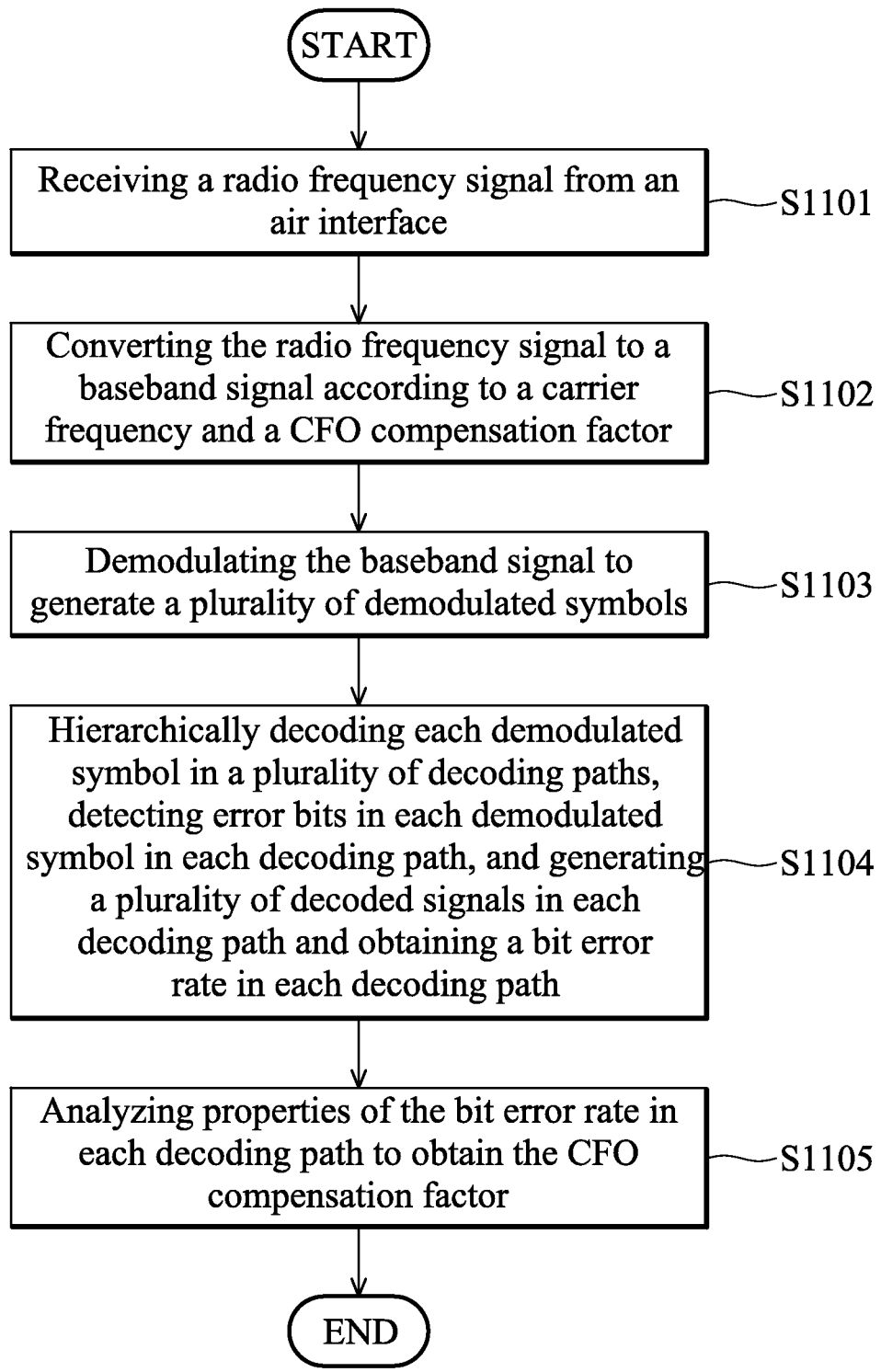
FIG. 11 shows a flow chart of a method for carrier frequency offset detection and compensation according to an embodiment of the invention.

FIG. 11 shows a flow chart of a method for carrier frequency offset detection and compensation according to an embodiment of the invention. First, the transceiver module 401 receives a radio frequency signal from an air interface (Step S1101). Next, the transceiver module 401 converts the radio frequency signal to a baseband signal according to a carrier frequency and a carrier frequency offset (CFO) compensation factor (Step S1102). Next, the adaptive hierarchical signal de-mapping module 408 demodulates the baseband signal to generate a plurality of demodulated symbols (Step S1103). Next, the decoding module 411 hierarchically decodes each demodulated symbol in a plurality of decoding paths, detects error bits in each demodulated symbol in each decoding path, so as to generate a plurality of decoded signals in each decoding path and obtain a bit error rate in each decoding path (Step S1104). Finally, the error analyzing device 412 analyzes properties of the bit error rate in each decoding path to obtain the CFO compensation factor (Step S1105).

Note that when the SNR of the communication system is low, the main factor dominating the BER is noise, not the interference generated between the sub-carriers. However, when the SNR of the communication system is high, the main factor to dominate the BER is the interference generated between the sub-carriers. When CFO exists, the BER may not be able to be decreased even if the SNR is high. Under this circumstance, Error Floor occurs. Therefore, accurately estimating the amount of carrier frequency offset is an important issue when the SNR is high. According to an embodiment of the invention, when estimating the amount of carrier frequency offset, it may be assumed that the channel quality is good; that is, the SNR is high. In addition, several BER threshold values may be predefined according to the properties of the error rates of each hierarchy. As an example, four BER threshold values may be predefined, such as $Nstd1=10^{-4}$, $Nstd2=10^{-3}$, $Nstd3=10^{-2}$ and $Nstd4=10^{-1}$. By using the predefined threshold values and analyzing the BER properties of each hierarchy as shown in FIG. 6 to FIG. 8, the amount of carrier frequency offset may be easily estimated.

Figure 12:
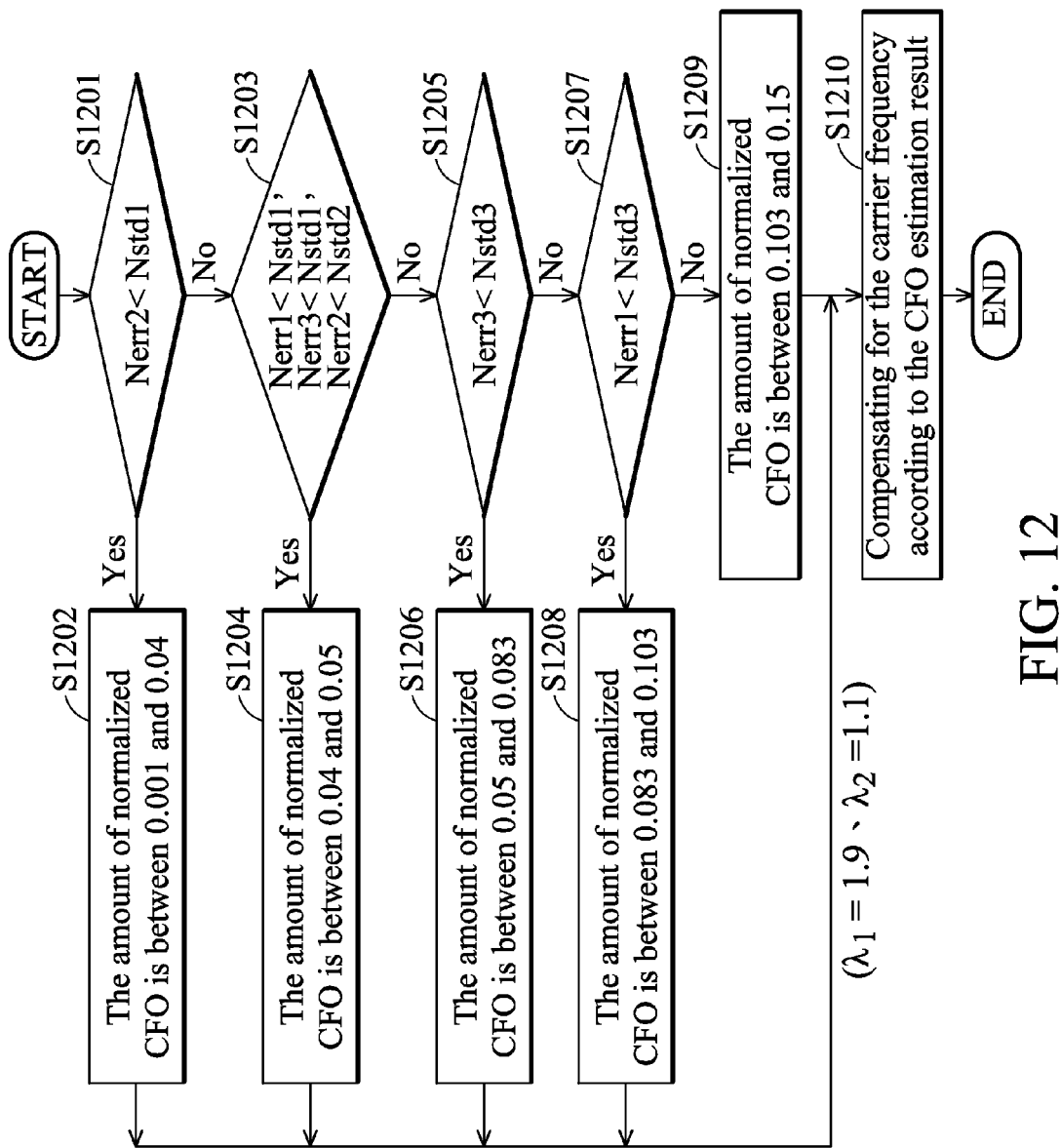
FIG. 12 shows a flow chart of a method for estimating the amount of carrier frequency offset according to an embodiment of the invention.

FIG. 12 shows a flow chart of a method for estimating the amount of carrier frequency offset according to an embodiment of the invention. In the embodiment, the hierarchical level distance ratios are $\lambda_1=1.9$ and $\lambda_2=1.1$. Reference may be made to FIGS. 6a to 6e, wherein it is shown that due to the influence of the CFO, the BERs of each hierarchy are different. According to the properties of the BERs of each hierarchy under different CFOs, the flow chart as shown in FIG. 12 may be designed. First, the error analyzing device 412 may determine whether the bit error rate Nerr2 of hierarchy 2 is smaller than a first threshold value Nstd1 (Step S1201). Since the error protection capability of hierarchy 2 is the worst one among the three hierarchies, when Nerr2<Nstd1, it means that the amount of CFO is small. Therefore, referring to the BER properties as shown in FIGS. 6a to 6e, the error analyzing device 412 may determine that the amount of a normalized CFO is between a first interval; for example, between 0.001 and 0.04 (Step S1202).

When Nerr2>=Nstd1, the error analyzing device 412 may further analyze the BERs of hierarchy 1 and hierarchy 3. As an example, the error analyzing device 412 may determine whether the BERs Nerr1 of hierarchy 1 and Nerr3 of hierarchy 3 are smaller than the first threshold value Nstd I, and whether the BER Nerr2 of hierarchy 2 is smaller than a second threshold value Nstd2 (Step S1203). When Nerr1<Nstd1, Nerr3<Nstd1, and Nerr2<Nstd2, the error analyzing device 412 may determine that the amount of a normalized CFO is between a second interval; for example, between 0.04 and 0.05 (Step S1204).

When Nerr1 is not smaller than the first threshold value Nstd1, or Nerr3 is not smaller than the first threshold value Nstd1, or Nerr2 is not smaller than the second threshold value Nstd2, the error analyzing device 412 may further determine whether Nerr3 is smaller than a third threshold value Nstd3 (Step S1205). When Nerr3<Nstd3, the error analyzing device 412 may determine that the amount of a normalized CFO is between a third interval; for example, between 0.05 and 0.083 (Step S1206). When Nerr3>=Nstd3, the error analyzing device 412 may further determine whether Nerr1 is smaller than the third threshold value Nstd3 (Step S1207). When Nerr1<Nstd3, the error analyzing device 412 may determine that the amount of a normalized CFO is between a fourth interval; for example, between 0.083 and 0.103 (Step S1208). When Nerr1>=Nstd3, the error analyzing device 412 may determine that the amount of a normalized CFO is between a fifth interval; for example, between 0.103 and 0.15 (Step S1209). After the error analyzing device 412 analyzes the amount of CFO, the frequency offset estimation device 413 may generate a CFO compensation factor Δf according to the analyzing result, and further feedback the CFO compensation factor Δf to the transceiver module 401 so as to instantaneously compensate for the carrier frequency according to the CFO compensation factor Δf (Step S1210).

Note that although the invention has been described by way of examples and in terms of preferred embodiments, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

Figure 13:
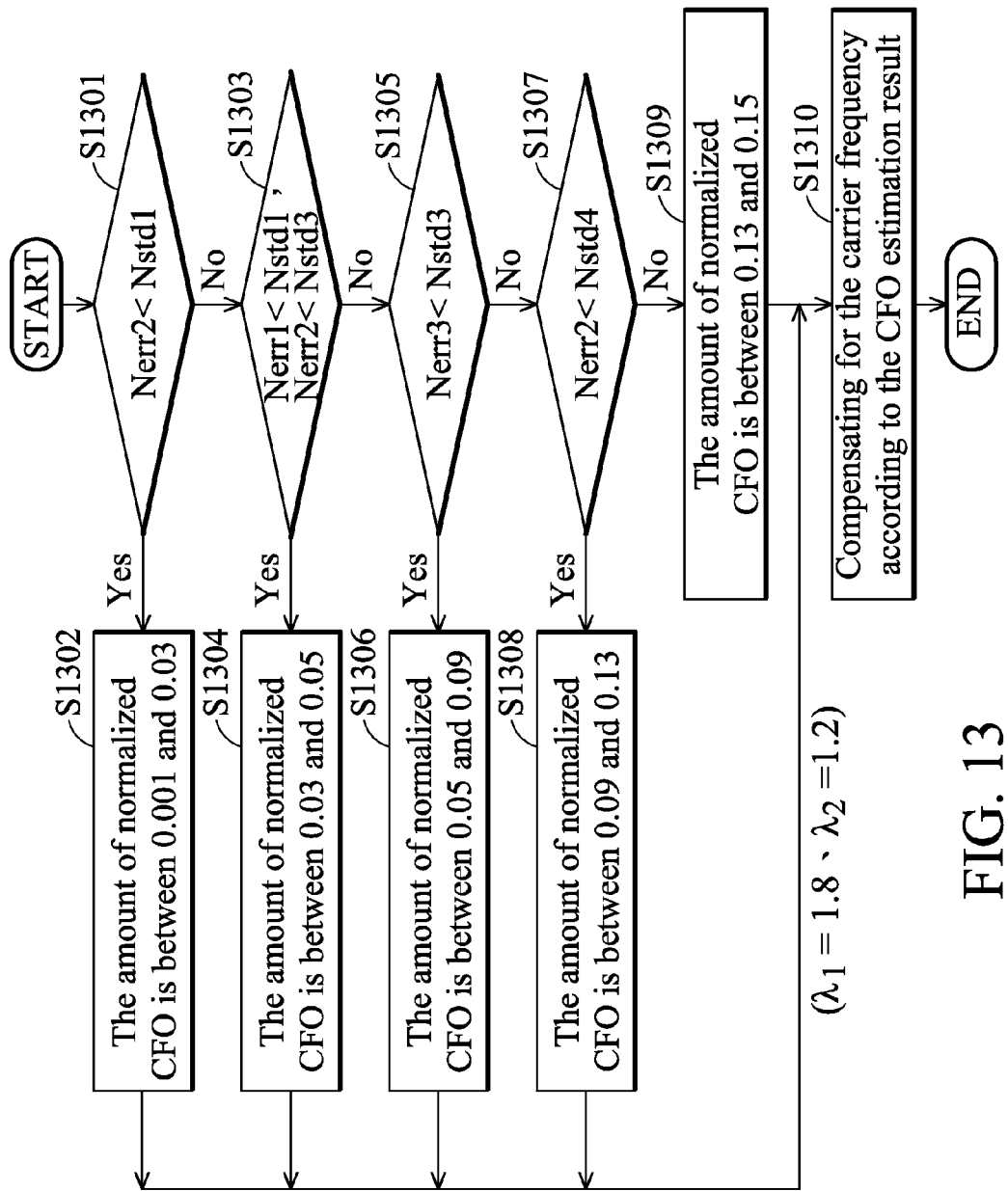
FIG. 13 shows a flow chart of a method for estimating the amount of carrier frequency offset according to another embodiment of the invention.

FIG. 13 shows a flow chart of a method for estimating the amount of carrier frequency offset according to another embodiment of the invention. In the embodiment, the hierarchical level distance ratios are $\lambda_1=1.8$ and $\lambda_2=1.2$. Referring to FIGS. 7a-7e, it can be seen that the influence of the CFO on the BERs of each hierarchy are different. According to the properties of the BERs of each hierarchy under different CFOs, the flow chart as shown in FIG. 13 may be designed. First, the error analyzing device 412 may determine whether the bit error rate Nerr2 of hierarchy 2 is smaller than the first threshold value Nstd1 (Step S1301). Since the error protection capability of hierarchy 2 is the worst one among the three hierarchies, when Nerr2<Nstd1, it means that the amount of CFO is small. Therefore, referring to the BER properties as shown in FIGS. 7a to 7e, the error analyzing device 412 may determine that the amount of a normalized CFO is between a first interval; for example, between 0.001 and 0.03 (Step S1302).

When Nerr2>=Nstd1, the error analyzing device 412 may further analyze the BER of hierarchy 1. As an example, the error analyzing device 412 may determine whether the BER Nerr1 of hierarchy 1 is smaller than the first threshold value Nstd1, and whether the BER Nerr2 of hierarchy 2 is smaller than the third threshold value Nstd3 (Step S1303). When Nerd<Nstd1 and Nerr2<Nstd3, the error analyzing device 412 may determine that the amount of a normalized CFO is between a second interval; for example, between 0.03 and 0.05 (Step S1304).

When Nerr1 is not smaller than the first threshold value Nstd1 or Nerr2 is not smaller than the third threshold value Nstd3, the error analyzing device 412 may further determine whether Nerr3 is smaller than the third threshold value Nstd3 (Step S1305). When Nerr3<Nstd3, the error analyzing device 412 may determine that the amount of a normalized CFO is between a third interval; for example, between 0.05 and 0.09 (Step S1306). When Nerr3>=Nstd3, the error analyzing device 412 may further determine whether Nerr2 is smaller than a fourth threshold value Nstd4 (Step S1307). When Nerr2<Nstd4, the error analyzing device 412 may determine that the amount of a normalized CFO is between a fourth interval; for example, between 0.09 and 0.13 (Step S1308). When Nerr2>=Nstd4, the error analyzing device 412 may determine that the amount of a normalized CFO is between a fifth interval; for example, between 0.13 and 0.15 (Step S1309). After the error analyzing device 412 analyzes the amount of CFO, the frequency offset estimation device 413 may generate a CFO compensation factor Δf according to the analyzing result, and further feedback the CFO compensation factor Δf to the transceiver module 401 so as to instantaneously compensate for the carrier frequency of the according to the CFO compensation factor Δf (Step S1310).

Note that although the invention has been described by way of examples and in terms of preferred embodiments, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

Figure 14:
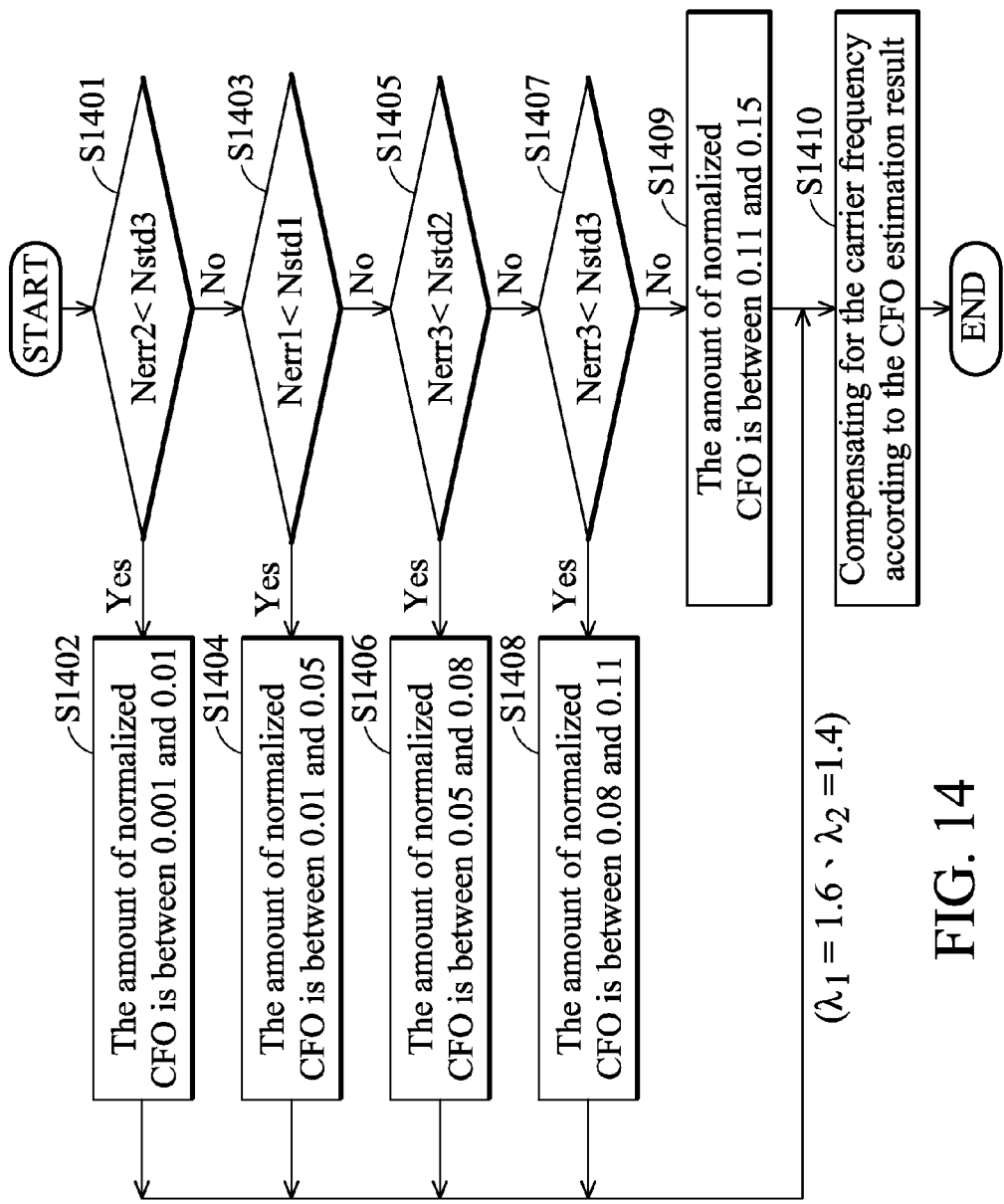
FIG. 14 shows a flow chart of a method for estimating the amount of carrier frequency offset according to yet another embodiment of the invention.

FIG. 14 shows a flow chart of a method for estimating the amount of carrier frequency offset according to another embodiment of the invention. In the embodiment, the hierarchical level distance ratios are $\lambda_1=1.6$ and $\lambda_2=1.4$. Referring to FIGS. 8a-8e, it can be seen that the influence of the CFO on the BERs of each hierarchy are different. According to the properties of the BERs of each hierarchy under different CFOs, the flow chart as shown in FIG. 14 may be designed. First, the error analyzing device 412 may determine whether the bit error rate Nerr2 of hierarchy 2 is smaller than the third threshold value Nstd3 (Step S1401). Since the error protection capability of hierarchy 2 is the worst one among the three hierarchies, when Nerr2<Nstd3, it means that the amount of CFO is small. Therefore, referring to the BER properties as shown in FIGS. 8a to 8e; the error analyzing device 412 may determine that the amount of a normalized. CFO is between a first interval; for example, between 0.001 and 0.01 (Step S1402).

When Nerr2>=Nstd3, the error analyzing device 412 may further analyze the BER of hierarchy 1. As an example, the error analyzing device 412 may determine whether the BER Nerr1 of hierarchy 1 is smaller than the first threshold value Nstd1 (Step S1403). When Nerr1<Nstd1, the error analyzing device 412 may determine that the amount of a normalized CFO is between a second interval; for example, between 0.01 and 0.05 (Step S1404).

When Nerr1 is not smaller than the first threshold value Nstd1, the error analyzing device 412 may further determine whether Nerr3 is smaller than the second threshold value Nstd2 (Step S1405). When Nerr3<Nstd2, the error analyzing device 412 may determine that the amount of a normalized CFO is between a third interval; for example, between 0.05 and 0.08 (Step S1406). When Nerr3>=Nstd2, the error analyzing device 412 may further determine whether Nerr3 is smaller than the third threshold value Nstd3 (Step S1407). When Nerr3<Nstd3, the error analyzing device 412 may determine that the amount of a normalized CFO is between a fourth interval; for example, between 0.08 and 0.11 (Step S1408). When Nerr3>=Nstd3, the error analyzing device 412 may determine that the amount of a normalized CFO is between a fifth interval; for example, between 0.11 and 0.15 (Step S1409). After the error analyzing device 412 analyzes the amount of CFO, the frequency offset estimation device 413 may generate a CFO compensation factor Δf according to the analyzing result, and further feedback the CFO compensation factor Δf to the transceiver module 401 so as to instantaneously compensate for the carrier frequency according to the CFO compensation factor Δf (Step S1410).

Note that although the invention has been described by way of examples and in terms of preferred embodiments, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

According to other embodiments of the invention, in addition to analyzing the BER by using the plurality of threshold values as previously described, a lookup table may also be utilized. The receiver may pre-store a lookup table comprising information regarding the relationship between the BERs of each hierarchy with respect to the normalized CFOs for different hierarchical level distance ratios $\lambda_1$ and $\lambda_2$. The lookup table may further comprise information regarding the plurality of cross points of the BER curves of different hierarchies. As the examples show in FIG. 6 to FIG. 8, the lookup table may comprise information regarding the cross points on the BER curves of different hierarchies with respect to different signal to noise ratios and/or different carrier frequency offsets. Therefore, the cross point information may indicate that the BER of the decoded signals in each decoding path may have different properties under different SNRs and/or different CFOs. In this manner, the error analyzing device 412 may perform CFO estimation and compensation by looking up the table.

System SNR Estimation

As previously described, the constellation points on the constellation may be distributed non-uniformly under hierarchical modulation, so that the BERs of each hierarchy vary in a specific manner with the change of the CFO. According to another embodiment of the invention, the specific variation may also be utilized for estimating the system SNR.

Generally, the channel quality of a communication system is determined according to the Received Signal Strength Indicator (RSSI). A base station usually requests a mobile station to report the received signal strength so as to make a correct choice and decision accordingly. The mobile station may comprise the transmitter and receiver as shown in FIG. 1 and FIG. 4. Therefore, the performance of a communication system is directly related to the accuracy of the reported received signal strength. According to an embodiment of the invention, when information relating to the signal strength cannot be correctly collected, the error analyzing device 412 may estimate the SNR of the channel in the air interface according to the properties of the BERs of each hierarchy.

Take the hierarchical level distance ratios $\lambda_1=1.6$ and $\lambda_2=1.4$ as an example, as shown in FIGS. 8a to 8e, the plurality of cross points generated by the BER curves of each hierarchy may define a plurality of SNR intervals. As an example, when the SNR is between 0 dB and 10 dB, the relationship between the BERs of different hierarchies is hierarchy 3>hierarchy 2>hierarchy 1. When the SNR is between 10 dB and 18 dB, the relationship between the BERs of different hierarchies is hierarchy 2>hierarchy 3>hierarchy 1. When the SNR exceeds 18 dB and the normalized CFO is smaller or equal to ¼, the relationship between the BERs of different hierarchies is hierarchy 2>hierarchy 1>hierarchy 3. When the normalized CFO exceeds ¼, since the Error Floor of hierarchy 3 occurs earlier (i.e. at a smaller SNR) than hierarchy 1, the relationship between the BERs of different hierarchies becomes hierarchy 2>hierarchy 3>hierarchy 1.

Figure 15:
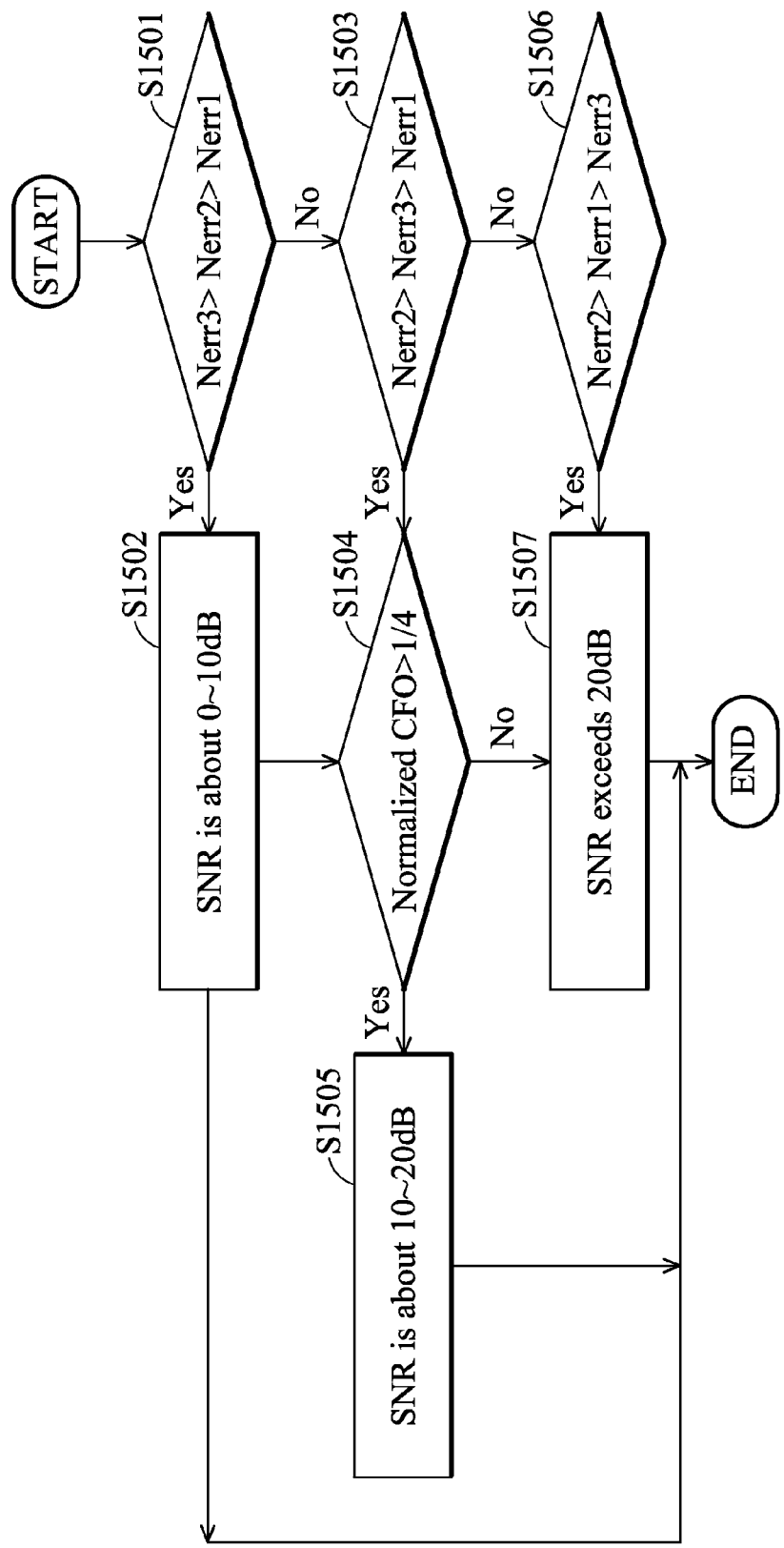
FIG. 15 shows a flow chart of a method for estimating the SNR according to an embodiment of the invention.

Based on this concept, FIG. 15 shows a flow chart of a method for estimating the SNR according to an embodiment of the invention. As previously described, it is assumed that the BERs obtained by the error analyzing device 412 are Nerr1 for hierarchy 1, Nerr2 for hierarchy 2 and Nerr3 for hierarchy 3. The error analyzing device 412 may first determine whether the relationship between the three BERs satisfies Nerr3>Nerr2>Nerr1 (Step S1501). When the relationship between the three BERs satisfies Nerr3>Nerr2>Nerr1, the error analyzing device 412 may determine that the SNR is about 0~10 dB (Step S1502). When the relationship between the three BERs does not satisfy Nerr3>Nerr2>Nerr1, the error analyzing device 412 may further determine whether the relationship between the three BERs satisfies Nerr2>Nerr3>Nerr1 (Step S1503). Since both times when the SNR is about 10~18 dB, and when the SNR exceeds 18 dB and the normalized CFO exceeds ¼, the relationship between the three BERs may satisfy Nerr2>Nerr3>Nerr1. Thus, the error analyzing device 412 must further determine whether the normalized CFO exceeds ¼ (Step S1504). When the normalized CFO exceeds ¼, the error analyzing device 412 may determine that the SNR is about 10~20 dB (Step S1505). When the normalized CFO does not exceed ¼, or when Nerr2>Nerr1>Nerr3, the error analyzing device 412 may determine that the current channel quality is good and the SNR exceeds 20 dB (Step S1507). At this time, the CFO would become the main factor dominating the BERs.

Moving Speed Estimation

According to another embodiment of the invention, the BERs of different hierarchies may also be applied to estimate the moving speed of the mobile station. The mobile station may comprise the transmitter and receiver as shown in FIG. 1 and FIG. 4. Take the hierarchical level distance ratios $\lambda_1=1.6$ and $2_2=1.4$ as an example, as shown in FIGS. 8a to 8e, by analyzing the Error Floors of the BER curves of each hierarchy, or analyzing the change in the amount of cross points, the moving speed of the mobile station may be accordingly estimated. As an example, when an Error Floor phenomenon occurs in all the BER curves of the three hierarchies (as shown in FIG. 8d and FIG. 8e), it is determined that the mobile station is moving at a high speed. Or, when the amount of cross points has changed, for example, from two to one (as shown in FIG. 8d and FIG. 8e), it is also determined that the mobile station is moving at a high speed.

Cross Lines

Figure 16:
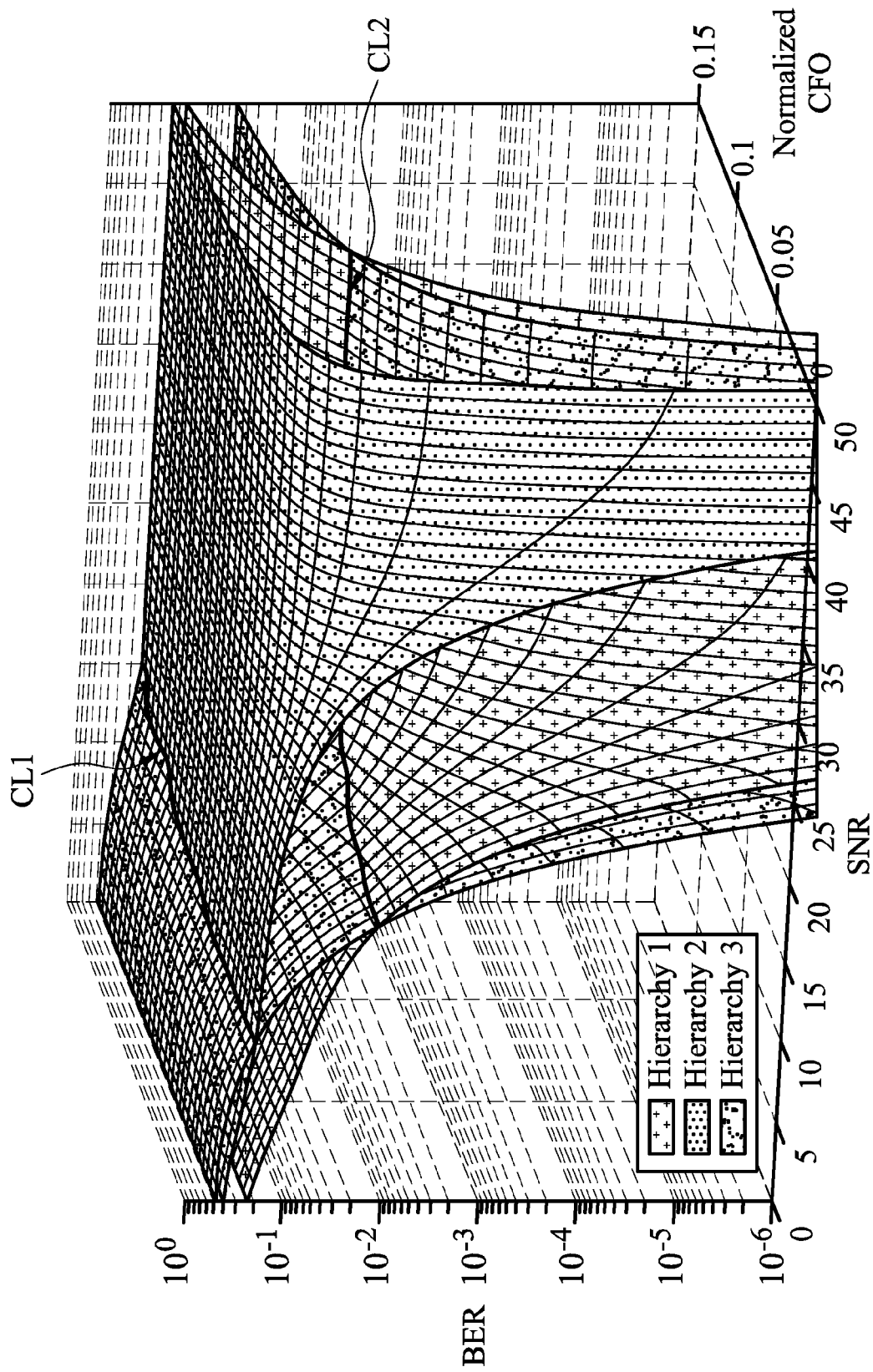
FIG. 16 is a diagram showing the relationship between the BER of each hierarchy, SNR and CFO.

According to another embodiment of the invention, the concept of cross points may further be extended to cross lines. Take the hierarchical level distance ratios $\lambda_1=1.6$ and $\lambda_2=1.4$ as an example, FIG. 16 is a diagram showing the relationship between the BER of each hierarchy, SNR and CFO. It can be seen from the 3D diagram as shown in FIG. 16 that for different CFOs, the cross points may be connected together to form the cross lines, such as the cross line CL1 formed on the intersection of the BER planes of hierarchy 2 and hierarchy 3, and the cross line CL2 formed on the intersection of the BER planes of hierarchy 1 and hierarchy 3. By adjusting the hierarchical level distance ratios $\lambda_1$ and $\lambda_2$, the BER of each hierarchy may have different variations under different CFOs and different SNRs. Therefore different properties of cross points and cross lines may be obtained. The error analyzing device 412 and/or frequency offset estimation device 413 may estimate the CFO compensation factor according to the hierarchical level distance ratios, the BER of each hierarchy, SNR . . . etc., and compensate for the carrier frequency offset accordingly.

While the invention has been described by way of examples and in terms of preferred embodiments, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A receiver, comprising:
   a transceiver module receiving a radio frequency signal from an air interface and converting the radio frequency signal to a baseband signal according to a carrier frequency and a carrier frequency offset (CFO) compensation factor;
   an adaptive hierarchical signal de-mapping module demodulating the baseband signal according to one or more hierarchical level distance ratios to obtain a plurality of demodulated symbols;
   a decoding module comprising a plurality of decoding paths to hierarchically decode the demodulated symbols and detect error bits in each demodulated symbol, and generating a plurality of decoded signals in each decoding path;
   an error analyzing device receiving error bit information of each decoding path from the decoding module and estimating a bit error rate (BER) in each decoding path; and
   a frequency offset estimation device generating the CFO compensation factor according to the bit error rates.

2. The receiver as claimed in claim 1, wherein the error analyzing device further adjusts the hierarchical level distance ratios according to the bit error rates and transmits the hierarchical level distance ratios to a transmitter via the transceiver module.

3. The receiver as claimed in claim 2, wherein when the bit error rates all exceed a threshold value, the error analyzing device adjusts the hierarchical level distance ratios so that a plurality of modulated symbols generated by the transmitter are uniformly distributed in a constellation, and when any one of the bit error rates is smaller than the threshold value, the error analyzing device adjusts the hierarchical level distance ratios so that the modulated symbols generated by the transmitter are non-uniformly distributed in the constellation.

4. The receiver as claimed in claim 1, wherein each decoding path comprises a decoder decoding a predetermined number of bits of the demodulated symbols, and a total number of bits decoded by the decoders is the amount of bits comprised in a demodulated symbol, and wherein the decoding module further corrects error bits in the demodulated symbols to generate an output signal.

5. The receiver as claimed in claim 1, wherein the adaptive hierarchical signal de-mapping module de-maps the baseband signal according to a constellation to generate the demodulated symbols and adjusts distances between a plurality of constellation points in the constellation according to the hierarchical level distance ratios so as to adjust non-uniformity of the distribution of the constellation points.

6. The receiver as claimed in claim 1, wherein the error analyzing device estimates an amount of carrier frequency offset according to the bit error rate in each decoding path and a lookup table, and the frequency offset estimation device generates the CFO compensation factor according to the amount of carrier frequency offset, wherein the lookup table comprises information regarding a plurality of cross points generated by the bit error rates in the decoding paths.

7. The receiver as claimed in claim 6, wherein the lookup table comprises information regarding different properties of the bit error rates of the decoded signals in each decoding path under different signal to noise ratios or different carrier frequency offsets.

8. The receiver as claimed in claim 6, wherein the lookup table comprises information regarding different properties of the bit error rates of the decoded signals in each decoding path under different signal to noise ratios and different carrier frequency offsets.

9. The receiver as claimed in claim 1, wherein the error analyzing device analyzes properties of the bit error rates and estimates a signal to noise ratio of a channel in the air interface according to the properties of the bit error rates.

10. The receiver as claimed in claim 9, wherein the frequency offset estimation device estimates the CFO compensation factor according to the signal to noise ratio and the properties of the bit error rates in each decoding path.

11. A method for carrier frequency offset detection and compensation, comprising:
    receiving a radio frequency signal from an air interface;
    converting the radio frequency signal to a baseband signal according to a carrier frequency and a carrier frequency offset (CFO) compensation factor;
    demodulating the baseband signal to generate a plurality of demodulated symbols;
    hierarchically decoding each demodulated symbol in a plurality of decoding paths, detecting error bits in each demodulated symbol in each decoding path, and generating a plurality of decoded signals in each decoding path and obtaining a bit error rate in each decoding path; and
    analyzing properties of the bit error rate in each decoding path to obtain the CFO compensation factor.

12. The method as claimed in claim 11, wherein the radio frequency signal is modulated according to one or more hierarchical level distance ratios, and the hierarchical level distance ratios define non-uniformity of distribution of a plurality of constellation points in a constellation for modulating the radio frequency signal.

13. The method as claimed in claim 11, wherein a predetermined number of bits of the demodulated symbols are decoded in each decoding path, and a total number of bits decoded in the decoding paths equals to an amount of bits comprised in a demodulated symbol.

14. The method as claimed in claim 12, further comprising:
    adjusting the hierarchical level distance ratios according to the properties of the bit error rate in each decoding paths; and
    transmitting the hierarchical level distance ratios to a transmitter modulating the radio frequency signal.

15. The method as claimed in claim 11, further comprising:
    estimating the CFO compensation factor according to the bit error rate in each decoding path and a lookup table, wherein the lookup table comprises information regarding a plurality of cross points generated by the bit error rates in the decoding paths.

16. The method as claimed in claim 15, wherein information regarding the cross points reveals different properties of the bit error rates of the decoded signals in each decoding path under different signal to noise ratios or different carrier frequency offsets.

17. The method as claimed in claim 12, further comprising:
    adjusting the hierarchical level distance ratios so that the constellation points are uniformly distributed in the constellation when the bit error rates all exceed a threshold value; and
    adjusting the hierarchical level distance ratios so that the constellation points are non-uniformly distributed in the constellation when any one of the bit error rates is smaller than the threshold value.

* * * * *